(12) United States Patent
Tu

(10) Patent No.: US 10,789,441 B2
(45) Date of Patent: Sep. 29, 2020

(54) METHOD AND APPARATUS FOR GENERATING AND IDENTIFYING IDENTIFICATION CODE

(71) Applicant: Alibaba Group Holding Limited, George Town (KY)

(72) Inventor: Yinhai Tu, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/698,271

(22) Filed: Nov. 27, 2019

(65) Prior Publication Data

US 2020/0097692 A1    Mar. 26, 2020

Related U.S. Application Data

(63) Continuation of application No. PCT/CN2018/101444, filed on Aug. 21, 2018.

(30) Foreign Application Priority Data

Aug. 23, 2017 (CN) .......................... 2017 1 0731246

(51) Int. Cl.
   *G06K 7/14*    (2006.01)
   *G06K 19/06*    (2006.01)
(52) U.S. Cl.
   CPC ..... *G06K 7/1417* (2013.01); *G06K 19/06037* (2013.01)
(58) Field of Classification Search
   None
   See application file for complete search history.

(56) References Cited

U.S. PATENT DOCUMENTS

| | | | | |
|---|---|---|---|---|
| 3,409,760 A | * | 11/1968 | Hamisch | ................ G06C 27/00 |
| | | | | 235/494 |
| 5,130,795 A | * | 7/1992 | Rusche | ................ G01S 3/7864 |
| | | | | 348/143 |

(Continued)

FOREIGN PATENT DOCUMENTS

| | | |
|---|---|---|
| CN | 1908955 | 2/2007 |
| CN | 1963843 | 5/2007 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Christle I Marshall
(74) *Attorney, Agent, or Firm* — Fish & Richardson P.C.

(57) ABSTRACT

One or more implementations shown in the present specification provide a method for generating an identification code. A center of a detection area is determined. A plurality of concentric circles are determined based on the center. A plurality of position detection patterns whose distance from the center is the radius are determined based on the center and a radius. A start pattern from each position detection pattern is determined. N-ary characters corresponding to a to-be-encoded content to obtain the identification code are encode on the concentric circles based on a position of the start pattern. Codes corresponding to adjacent and same characters in the N-ary characters form an arc line segment. A code corresponding to a character that is different from both adjacent characters in the N-ary characters is a point. Codes corresponding to different characters in the N-ary characters have different colors.

20 Claims, 26 Drawing Sheets

(56) References Cited

U.S. PATENT DOCUMENTS

| | | | |
|---|---|---|---|
| 7,143,944 B2* | 12/2006 | Lapstun | G06K 1/121 |
| | | | 235/462.01 |
| 7,270,277 B1* | 9/2007 | Koziol | G06K 19/06037 |
| | | | 235/494 |
| 7,398,928 B2* | 7/2008 | Gaspard | G01C 15/02 |
| | | | 235/454 |
| 7,621,459 B2* | 11/2009 | Hovis | G06K 7/1421 |
| | | | 235/454 |
| 7,732,755 B2* | 6/2010 | Chin | G01D 5/24438 |
| | | | 250/226 |
| 8,376,240 B2 | 2/2013 | Kiliccote | |
| 10,237,277 B2* | 3/2019 | Leach | H04W 12/0804 |
| 10,387,702 B2* | 8/2019 | Noth | G06K 7/1421 |
| 2002/0020747 A1 | 2/2002 | Wakamiya et al. | |
| 2005/0269412 A1* | 12/2005 | Chiu | G06K 9/4633 |
| | | | 235/462.03 |
| 2007/0278316 A1 | 12/2007 | Hovis | |
| 2009/0090786 A1 | 4/2009 | Hovis | |
| 2011/0044561 A1* | 2/2011 | Braunecker | G01D 5/3473 |
| | | | 382/296 |
| 2011/0045893 A1* | 2/2011 | Hiraro | A63F 13/45 |
| | | | 463/25 |
| 2013/0094013 A1 | 4/2013 | Hovis et al. | |
| 2016/0342873 A1* | 11/2016 | Feld | G06K 7/10722 |
| 2017/0193260 A1 | 7/2017 | Prusik et al. | |
| 2018/0048652 A1 | 2/2018 | Leach et al. | |
| 2019/0207618 A1* | 7/2019 | Lowe | G06F 3/04886 |
| 2019/0311169 A1* | 10/2019 | Xu | G06K 7/1421 |

FOREIGN PATENT DOCUMENTS

| | | |
|---|---|---|
| CN | 101086761 | 12/2007 |
| CN | 101859397 | 10/2010 |
| CN | 103793735 | 5/2014 |
| CN | 104154904 | 11/2014 |
| CN | 105894067 | 8/2016 |
| CN | 106447001 | 2/2017 |
| CN | 106951812 | 7/2017 |
| CN | 107122816 | 9/2017 |
| CN | 107590522 | 1/2018 |
| KR | 19990017026 | 3/1999 |
| TW | M484752 | 8/2014 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2018/101444, dated Nov. 16, 2018, 9 pages (with partial English translation).

PCT International Preliminary Report on Patentability in International Application No. PCT/CN2018/101444, dated Feb. 25, 2020, 10 pages (with English translation).

Extended European Search Report in European Application No. 18847369.8 , dated Jun. 30, 2020, 7 pages.

\* cited by examiner

METHOD AND APPARATUS FOR GENERATING AND IDENTIFYING IDENTIFICATION CODE

CROSS-REFERENCE TO RELATED APPLICATIONS

This application is a continuation of PCT Application No. PCT/CN2018/101444, filed on Aug. 21, 2018, which claims priority to Chinese Patent Application No. 201710731246.X, filed on Aug. 23, 2017, and each application is hereby incorporated by reference in its entirety.

TECHNICAL FIELD

The present application relates to the field of information technologies, and in particular, to a method and an apparatus for generating and identifying an identification code.

BACKGROUND

Currently, the main stream identification code is usually a barcode and a two-dimensional code. The two-dimensional code can carry a large amount of data, and can be written into information such as a picture, an audio, and a video, and an identification success rate is higher, so that the two-dimensional code can be applied more widely, and gradually becomes an identification code mainly used by a user (for example, a person or an enterprise).

Generally, a basic composition of the two-dimensional code is a position detection pattern (Position Detection Pattern, also referred to as a positioning stub), functional data, and a data code. The positioning stub is configured to determine a data storage area (that is, a functional data area or a data code area) of a two-dimensional code when identifying the two-dimensional code. The functional data is used to provide version information of the two-dimensional code, so that a manner of identifying the data code can be determined during identification. The data code is code that stores content (for example, after an image is converted into a binary code, a filled block is used to indicate 1, an unfilled block is used to indicate 0, and the image content is converted into a data code to be written into a two-dimensional code), as shown in FIG. 1. Certainly, there are various encoding manners in the existing two-dimensional code generation technology, and the previous description is merely an example.

In addition, the data code may further include an error correction code used to tolerate an error, and the error correction code may assist in identifying complete content corresponding to the data code when the two-dimensional code is damaged.

Based on the existing identification code technology, the present application provides a new identifier generation and identification process.

SUMMARY

Implementations of the present specification provide a method for generating and identifying an identification code and apparatus, so as to resolve a problem of relatively single form of identification code generated in the existing technology and poor user experience.

The implementations of the present disclosure use the following technical solutions:

A method for generating an identification code, including: determining a center; determining several concentric circles based on the center, and determining, based on the center and a specified radius, several position detection patterns whose distance from the center is the radius, where the several position detection patterns are not completely the same; determining a start pattern from each position detection pattern; and encoding, on the concentric circles based on a position of the start pattern, N-ary characters corresponding to to-be-encoded content to obtain an identification code, where codes corresponding to adjacent and same characters in the N-ary characters form an arc line segment, a code corresponding to a character that is different from both adjacent characters in the N-ary characters is a point, codes corresponding to different characters in the N-ary characters have different colors, and N is a positive integer not less than two.

A method for identifying an identification code, including: collecting an image; determining, from the image, position detection patterns in an identification code; determining a center of the identification code based on the position detection patterns; determining a start pattern from the position detection patterns based on the center and the position detection patterns; and identifying the identification code based on a position of the start pattern, where the identification codes include codes on several concentric circles, codes corresponding to adjacent and same characters in the coding content form an arc line segment, a code corresponding to a character that is different from adjacent characters in the coding content is a point, and coding colors corresponding to different characters in the coding content are different.

An identification code generation apparatus, including: a first determining module, configured to determine a center; a second determining module, configured to determine several concentric circles based on the center, and determine, based on the center and a specified radius, several position detection patterns whose distance from the center is the radius, where the several position detection patterns are not completely the same; a third determining module, configured to determine a start pattern from the position detection patterns; and a generation module, configured to encode, on the concentric circles based on a position of the start pattern, N-ary characters corresponding to to-be-encoded content to obtain an identification code, where codes corresponding to adjacent and same characters in the N-ary characters form an arc line segment, a code corresponding to a character that is different from both adjacent characters in the N-ary characters is a point, codes corresponding to different characters in the N-ary characters have different colors, and N is a positive integer not less than two.

An identification code identification apparatus, including: a collecting module, configured to collect an image; a first determining module, configured to determine, from the image, position detection patterns in an identification code; a second determining module, configured to determine a center of the identification code based on the position detection patterns; a third determining module, configured to determine a start pattern from the position detection patterns based on the center and the position detection patterns; and an identification module, configured to identify the identification code based on a position of the start pattern, where the identification codes include codes on several concentric circles, codes corresponding to adjacent and same characters in the coding content form an arc line segment, a code corresponding to a character that is different from adjacent characters in the coding content is a point, and coding colors corresponding to different characters in the coding content are different.

A server, including one or more processors and a memory, where the memory stores a program, configured to be executed by the one or more processors to perform the following steps: determining a center; determining several concentric circles based on the center, and determining, based on the center and a specified radius, several position detection patterns whose distance from the center is the radius, where the several position detection patterns are not completely the same; determining a start pattern from each position detection pattern; and encoding, on the concentric circles based on a position of the start pattern, N-ary characters corresponding to to-be-encoded content to obtain an identification code, where codes corresponding to adjacent and same characters in the N-ary characters form an arc line segment, a code corresponding to a character that is different from both adjacent characters in the N-ary characters is a point, codes corresponding to different characters in the N-ary characters have different colors, and N is a positive integer not less than two.

An end-user device, including one or more processors and a memory, where the memory stores a program, configured to be executed by the one or more processors to perform the following steps: collecting an image; determining, from the image, position detection patterns in an identification code; determining a center of the identification code based on the position detection patterns; determining a start pattern from the position detection patterns based on the center and the position detection patterns; and identifying the identification code based on a position of the start pattern, where the identification codes include codes on several concentric circles, codes corresponding to adjacent and same characters in the coding content form an arc line segment, a code corresponding to a character that is different from adjacent characters in the coding content is a point, and coding colors corresponding to different characters in the coding content are different.

The previously described at least one technical solution used in the implementations of the present specification can achieve the following beneficial effects:

According to the method provided in the present specification, when an identification code is being generated, N-ary characters corresponding to to-be-encoded content are encoded on several concentric circles starting from a start graph in the position detection patterns, so that the identification code including several arc line segments and points on the concentric circle can be generated. As such, forms of the identification code are more abundant, and user experience in using the identification code (for example, identifying and displaying the identification code) is better.

BRIEF DESCRIPTION OF DRAWINGS

Accompanying drawings are used for providing a further understanding of the present application, constitute a part of the specification, and are used to explain the present application together with implementations of the present application, but do not constitute a limitation on the present application. In the accompanying drawings.

DESCRIPTION OF IMPLEMENTATIONS

Figure 1:
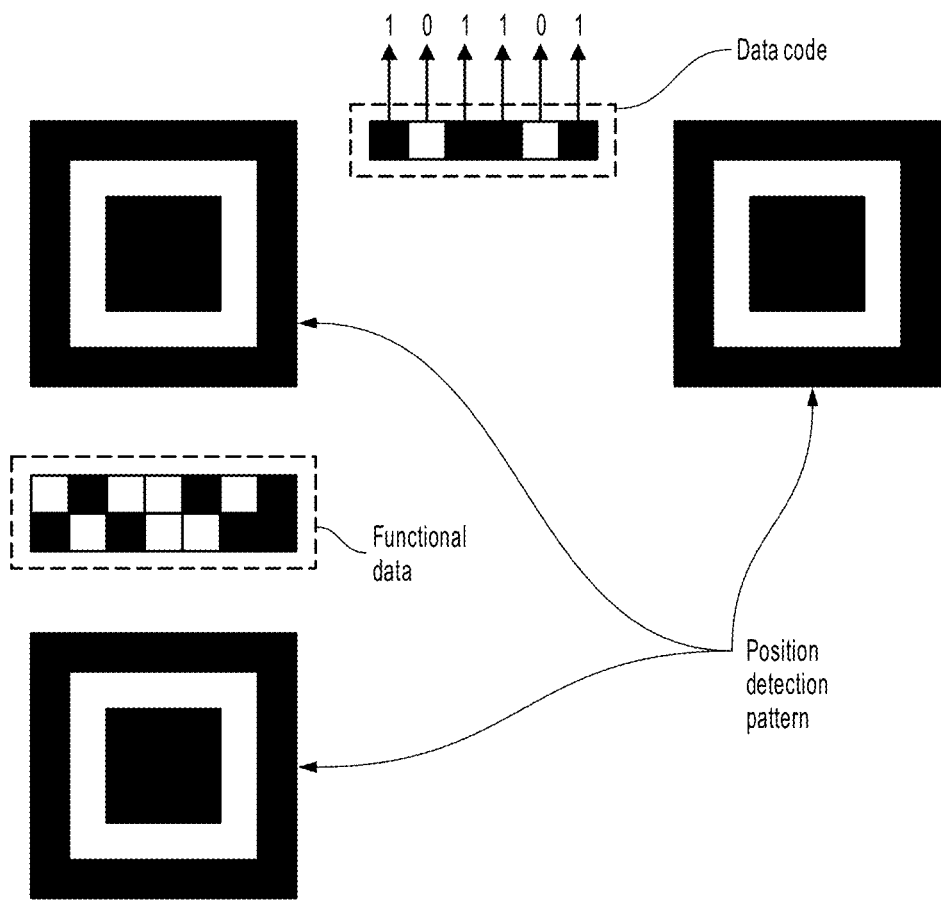
FIG. 1 is a schematic structural diagram illustrating an existing two-dimensional code.

In the existing technology, an identification code generator (usually a merchant, an enterprise, or a person) encodes content that needs to be provided according to an existing identifier generation rule (for example, a rule such as PDF 417, QR Code, Code 49, Code 16K, and Code One), to obtain an identification code. The content is then provided by providing the identification code to an identification object (usually a user).

Generally, in addition to providing content corresponding to the code, the identification code may further provide non-encoded content, which may be used to prompt the user of a use of the identification code, code content, and the like, so that the user roughly determines content included in the identification code or a type of content included in the identification code. The non-encoded content may be added to the identification code in a form of a pattern, a character, a text, or the like to be provided for the user. For example, the non-encoded content is a trademark (logo) of a brand, so that when the user sees the identifier, the user can roughly determine a brand of the content provided by the identification code. Alternatively, the non-encoded content is a use of the identification code, for example, text: "Scan to pay" or "Scan to obtain a coupon", so that the user seeing the non-encoded content can roughly understand the use of the identification code.

The following uses an example in which the non-encoded content is a logo of a brand for description. In the existing technology, a logo is generally used to establish a user awareness of a brand, and an owner of the logo (which may be considered as a content provider of an identification in this solution) improves exposure of the logo in a manner of advertisement or the like, so that the user gradually establishes recognition of the logo. When a user sees logo of different brands, the user can intuitively determine a type of merchant, enterprise, or individual corresponding to the logo.

Adding a logo to the identification can prompt the user that content provided by the identification is information about a brand corresponding to the logo, and may attract a user interested in the brand to identify the identifier.

However, an objective of occurrence of the identification is mainly to obtain content in a large quantity and quickly by using a machine instead of providing non-encoded content. Therefore, generally the non-encoded content occupies a relatively small area in the identification code, and information that can be provided by the non-encoded content is limited.

For example, although a logo can be added to a two-dimensional code generated by using the existing technology, an area occupied by the logo in the two-dimensional code is generally small, and most areas are mainly "codes" of the two-dimensional code. As a result, the logo is not obvious. In a case in which a size of the two-dimensional code is limited (for example, a printed two-dimensional code with an area of 1 square centimeter), clarity of the displayed logo is further affected, which makes it difficult for the user to identify the logo in the two-dimensional code, and content of the identification code is difficult to be determined according to the logo.

It can be learned that although a logo can be added to the identification generated in the existing technology, it is difficult for the user to recognize the logo in the identification code because the logo is not obvious or clear. In the user's view, there is little difference between different identification codes. However, as the use of the identification code becomes regular, the identification code is widely used, but no corresponding brand recognition effect is improved. For a content provider of the identification code, it is a waste of resources.

In other words, an identification code generated by an existing identification code technology is difficult to improve a brand recognition effect, and a large resource waste is generated. In addition, an identification code form is relatively single, and user experience is poor.

Implementations of the present specification provide a method and an apparatus for generating and identifying an identification code, so as to resolve the problem of relatively single form of identification code generated in the existing technology and poor user experience.

To make the objectives, technical solutions, and advantages of the present specification clearer, the following clearly and describes the technical solutions of the present application with reference to specific implementations of the present specification and corresponding accompanying drawings. Apparently, the described implementations are a part rather than all of the implementations of the present application. All other implementations obtained by a person of ordinary skill in the art based on the implementations of the present application without creative efforts shall fall within the protection scope of the present application.

The following describes in detail the technical solutions provided in the implementations of the present application with reference to the accompanying drawings.

Figure 2:
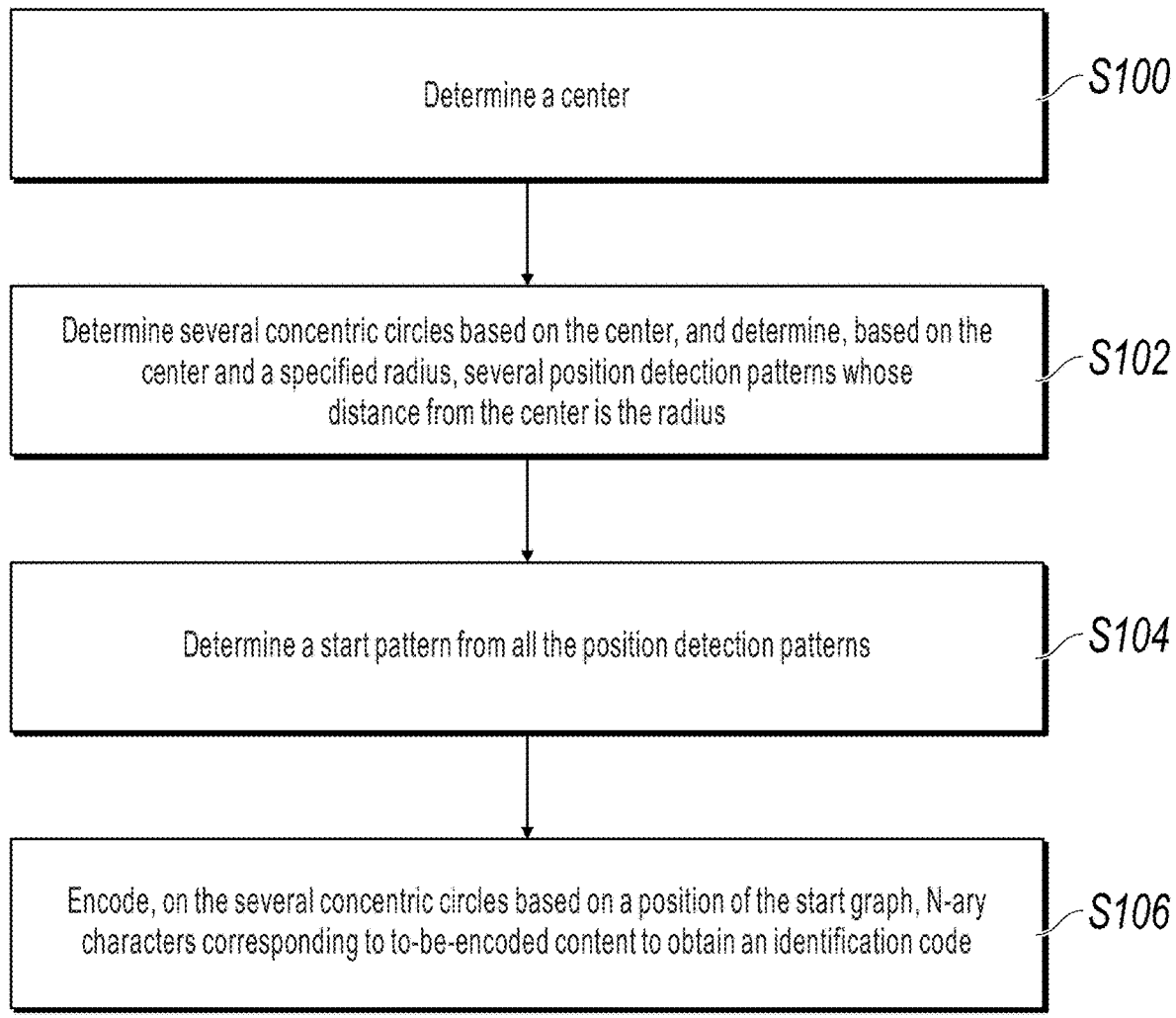
FIG. 2 shows an identification code generation process according to an implementation of the present specification.

FIG. 2 is a process of generating an identification code according to an implementation of the specification, which may specifically include the following steps:

S100. Determine a center.

In one or more implementations of the present specification, a device of a generator of the identification code (such as a server, a computer, or a mobile device, and the following uses a server as an example for description) can write content in the identification code based on a requirement to generate the identification code. The server may be a single device or a system including a plurality of devices, for example, a distributed system, which is not limited in the present specification.

Wherein the identification code generated in the present specification is a pattern that uses a circle as a main element in terms of appearance. Therefore, the server can first determine a center as a center of the identification code (as shown in FIG. 3), and generate the identification code based on the center through a subsequent operation.

Figure 3:
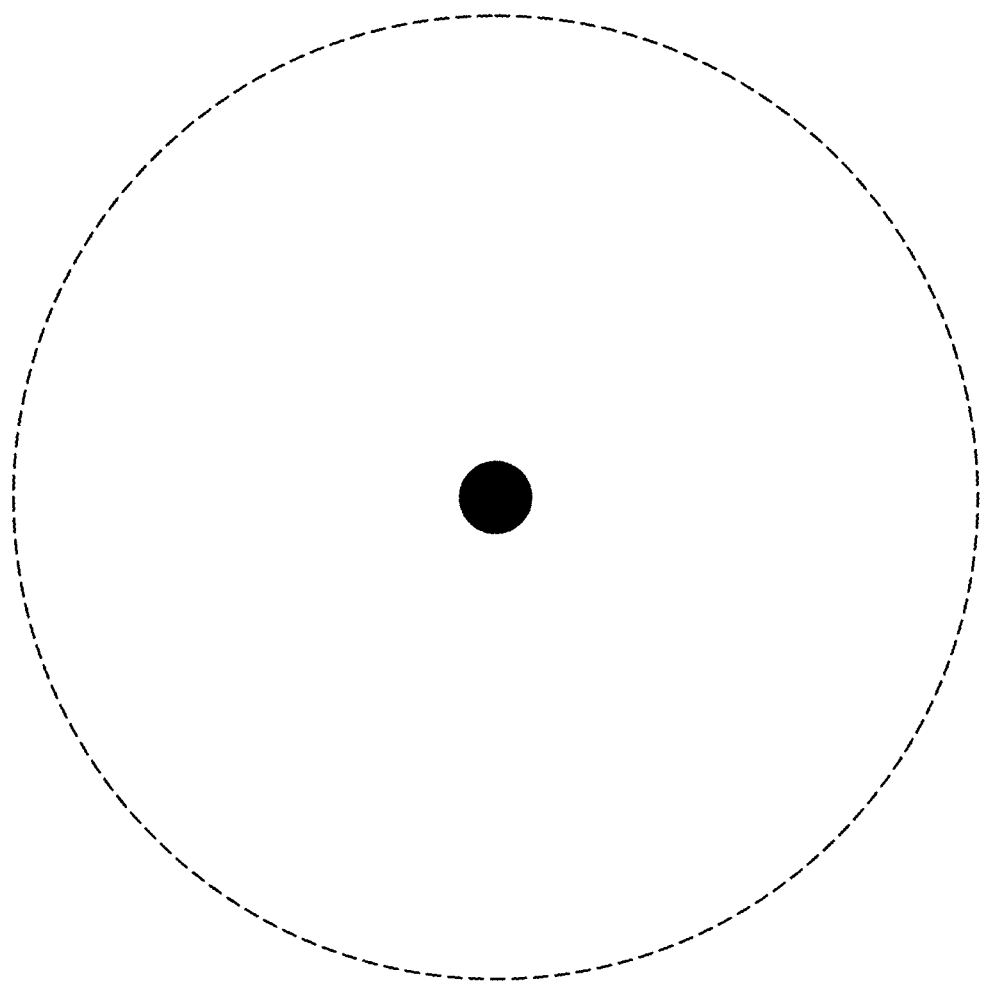
FIG. 3 is a schematic diagram illustrating a process of determining a center, according to an implementation of the present specification.

FIG. 3 is a schematic diagram illustrating the center provided in the present implementation of the present specification. The point represents the center, and the dotted circle represents that the point is the center of the circle, which is used as auxiliary description in FIG. 3 to indicate that the point is the center.

S102. Determine several concentric circles based on the center, and determine, based on the center and a specified radius, several position detection patterns whose distance from the center is the radius.

Similar to the existing technology, the server needs to first determine a position detection pattern of a to-be-generated identification. In this implementation of the specification, the server may determine, based on the center determined in step S100 and the specified radius, several position detection patterns whose distance from the center is the specified radius. In addition, the server can further determine several concentric circles based on the center. In this case, the determined several concentric circles may be used to determine a coding position when subsequent coding is performed.

Figure 4A:
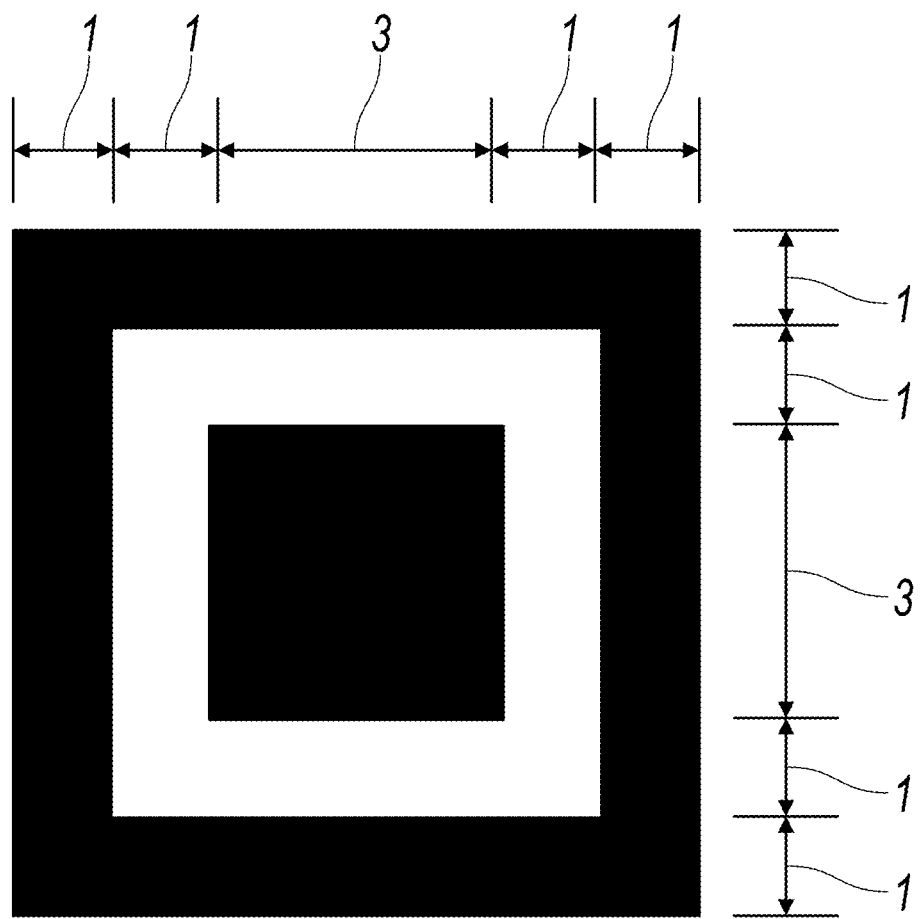
FIG. 4a is a schematic diagram illustrating a position detection pattern of an existing two-dimensional code.
Figure 4B:
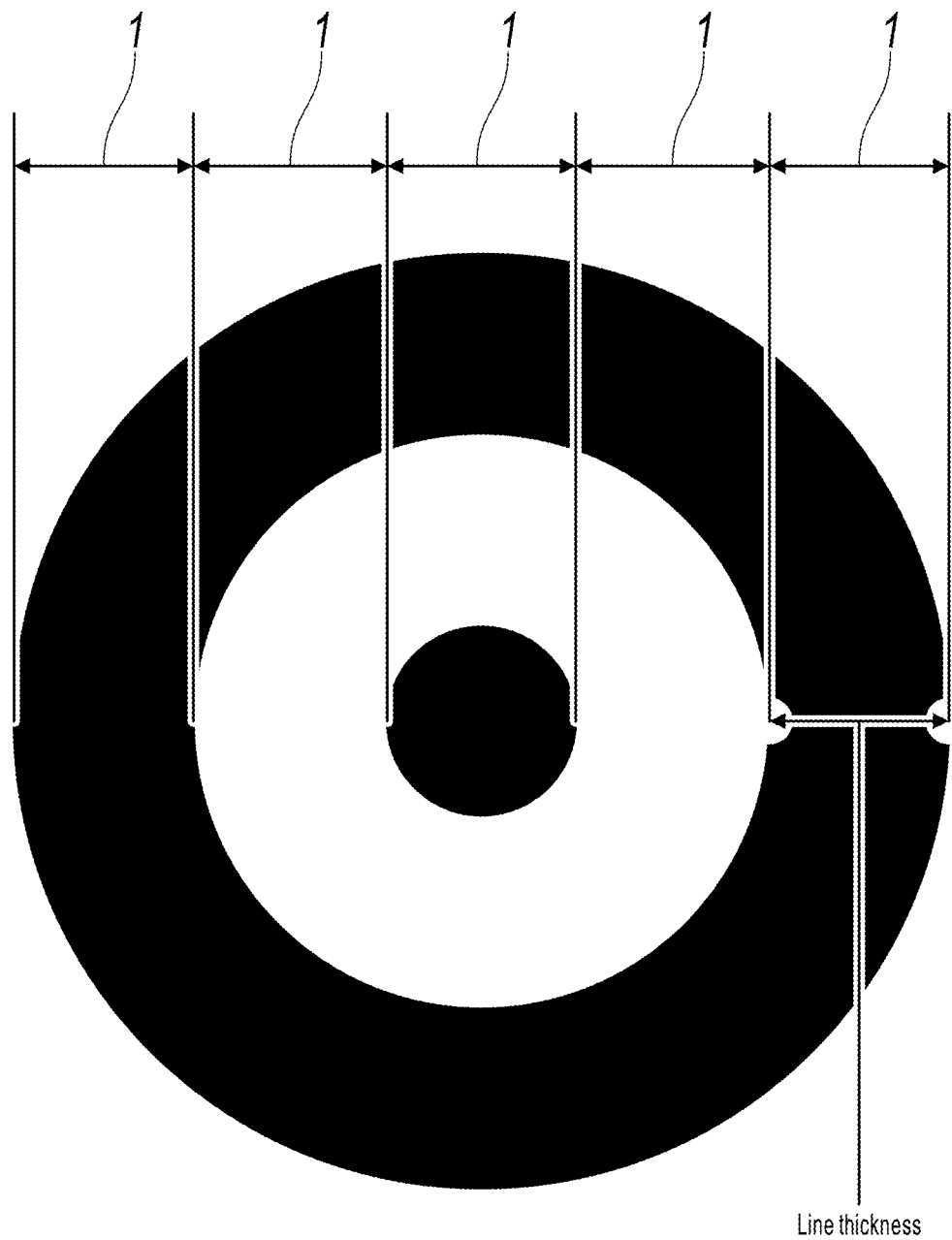
FIG. 4b is a schematic diagram illustrating a position detection pattern, according to an implementation of the present specification.

In the present specification, the position detection patterns determined by the server can be different, and shapes of the position detection patterns may include an isometric concentric circle and a regular hexagon. In addition, different from an existing two-dimensional code in which a position detection pattern is a concentric square, and a ratio of heterochromatic pixels in a vertical direction and a horizontal direction is 1:1:3:1:1, as shown in FIG. 4a, in the present specification, a position detection pattern whose shape is an isometric concentric circle is in any diameter direction, and a ratio of heterochromatic pixels is 1:1:1:1:1. That is, lines of each isometric concentric circle are the same in thickness, and the thickness of the lines may be a predetermined width, as shown in FIG. 4B.

Where, there may be three position detection patterns whose shapes are isometric concentric circles, and there may be one position detection pattern whose shape is a regular hexagon. In this case, the position detection pattern whose shape is an isometric concentric circle is used to preliminarily determine the position of the identification code when the identification code is being identified (or mainly determine the position of the identification code by using the position detection pattern whose shape is an isometric concentric circle). A position detection pattern whose shape is a regular hexagon is used as an abnormal position detection pattern, and may be used for auxiliary positioning when the identification code is being identified. Certainly, in the present specification, a quantity of position detection patterns may also be set based on a requirement, for example, four position detection patterns whose shapes are isometric concentric circles, and two position detection patterns whose shapes are regular hexagons.

Figure 4C:
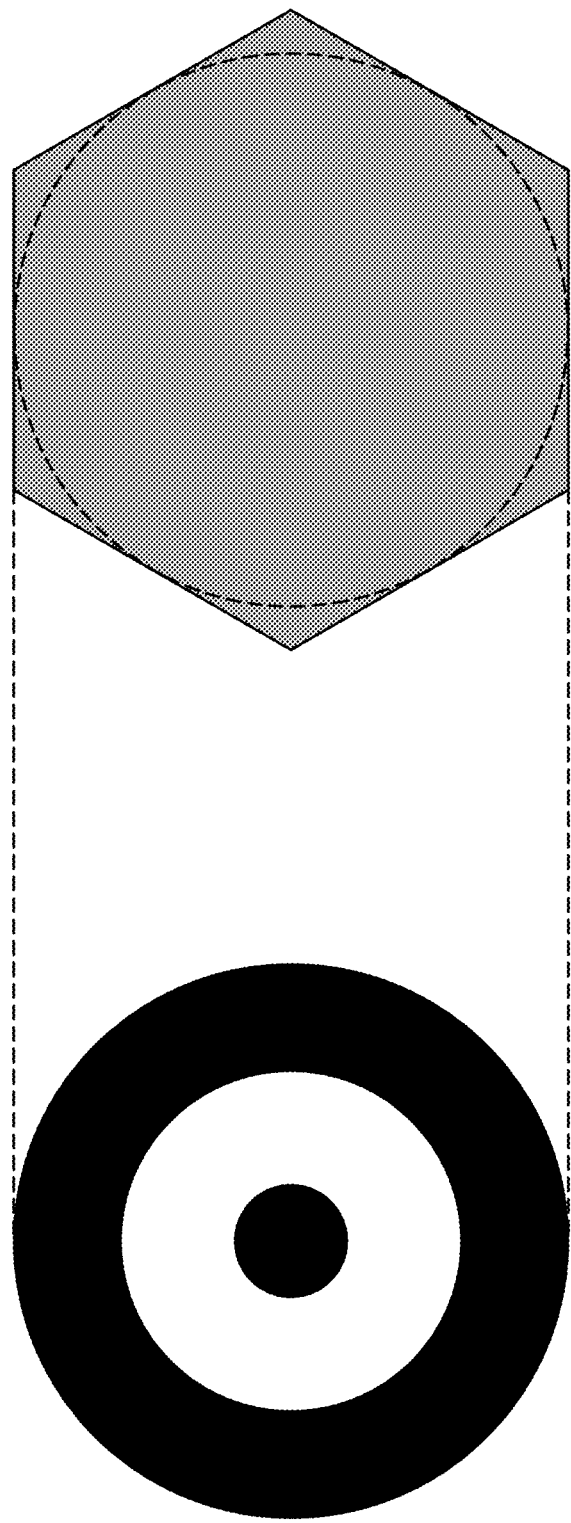
FIG. 4c is a schematic diagram illustrating position detection patterns that are not completely the same, according to an implementation of the present specification.

In addition, because the regular hexagon is different from the isometric concentric circle, and a boundary of the regular hexagon is a straight line, in a process of identifying the identification code, the position detection pattern whose shape is a regular hexagon may be further used to assist in determining a distortion status, an inclination status, and the like of the identification code. Specifically, the side length of the position detection pattern whose shape is a regular hexagon may be set based on a requirement, which is not limited in the present specification. For example, a diameter of an outer circle of a position detection pattern whose shape is a regular hexagon is equal to a maximum diameter of a position detection pattern whose shape is an isometric concentric circle, as shown in FIG. 4c.

Certainly, in addition to the previous two shapes of position detection patterns, the server may further generate position detection patterns of different shapes, for example, a square, a regular triangle, a concentric rectangle, or a pattern with a symbol. A shape and a pattern of a position detection pattern are not limited in the present specification, and may be set based on a requirement.

Figure 5A:
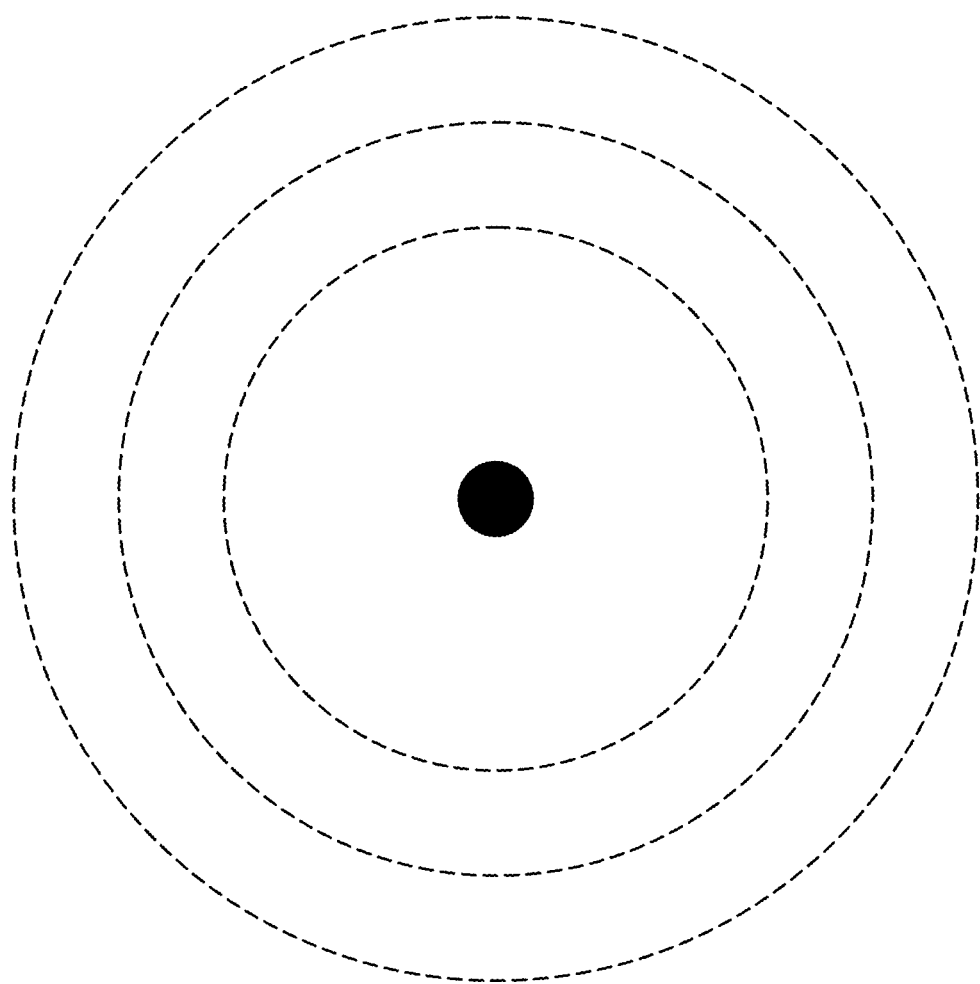
FIG. 5a is a schematic diagram illustrating a process of determining several concentric circles, according to an implementation of the present specification.

In addition, the server may further determine several concentric circles based on the center, as shown in FIG. 5a. Different from the previously described position detection patterns which are actually generated by the server, the several concentric circles are virtual. The concentric circles are only used to assist in subsequent encoding in an identification code generation process, and are not displayed when the identification code is displayed after the identification code is generated.

Further, in step S102, there may be a logical sequence or no logical sequence between the step in which the server determines the position detection patterns and the step in which the server determines a concentric circle that is subsequently used for auxiliary encoding. When there is a logical sequence between the two steps, the server can first determine the position detection patterns, and then determine several concentric circles based on the position detection patterns; or the server can first determine several concentric circles, and then determine the position detection patterns based on at least one of the concentric circles.

The following provides three methods by using an example in which there is a logical sequence between the previously described two steps.

Specifically, in the first method provided in this implementation of the specification, the server can first determine several concentric circles based on the center. When the position detection patterns are determined based on the center and the specified radius, a concentric circle whose radius is the specified radius may be first selected from the determined concentric circles, and then the position detection patterns are determined on the selected concentric circle.

Alternatively, in the second method provided in this implementation of the specification, the server may first determine several concentric circles according to the center, select any concentric circle from the determined concentric circles, use a radius of the selected concentric circle as a specified radius, and then determine the position detection patterns on the selected concentric circle. For convenience of description, a radius (that is, the specified radius) of the concentric circle in which the position detection patterns are located is represented by CodeR.

Further, in the third method provided in this implementation of the specification, the server may first determine several position detection patterns based on the center and the specified radius. When determining each concentric circle, the server may establish a first concentric circle by using the specified radius, and then increase and/or decrease the radius by a predetermined step length, to obtain several radii, and then determine the concentric circles based on the center and the obtained radii. In addition, the server may determine a predetermined quantity of concentric circles, where the predetermined quantity can be at least one of 3, 4, or 5. The predetermined step may be set based on a requirement. For example, the predetermined step is twice as thick as a line whose shape is equal to that of the concentric circle, as shown in FIG. 5b.

Figure 5B:
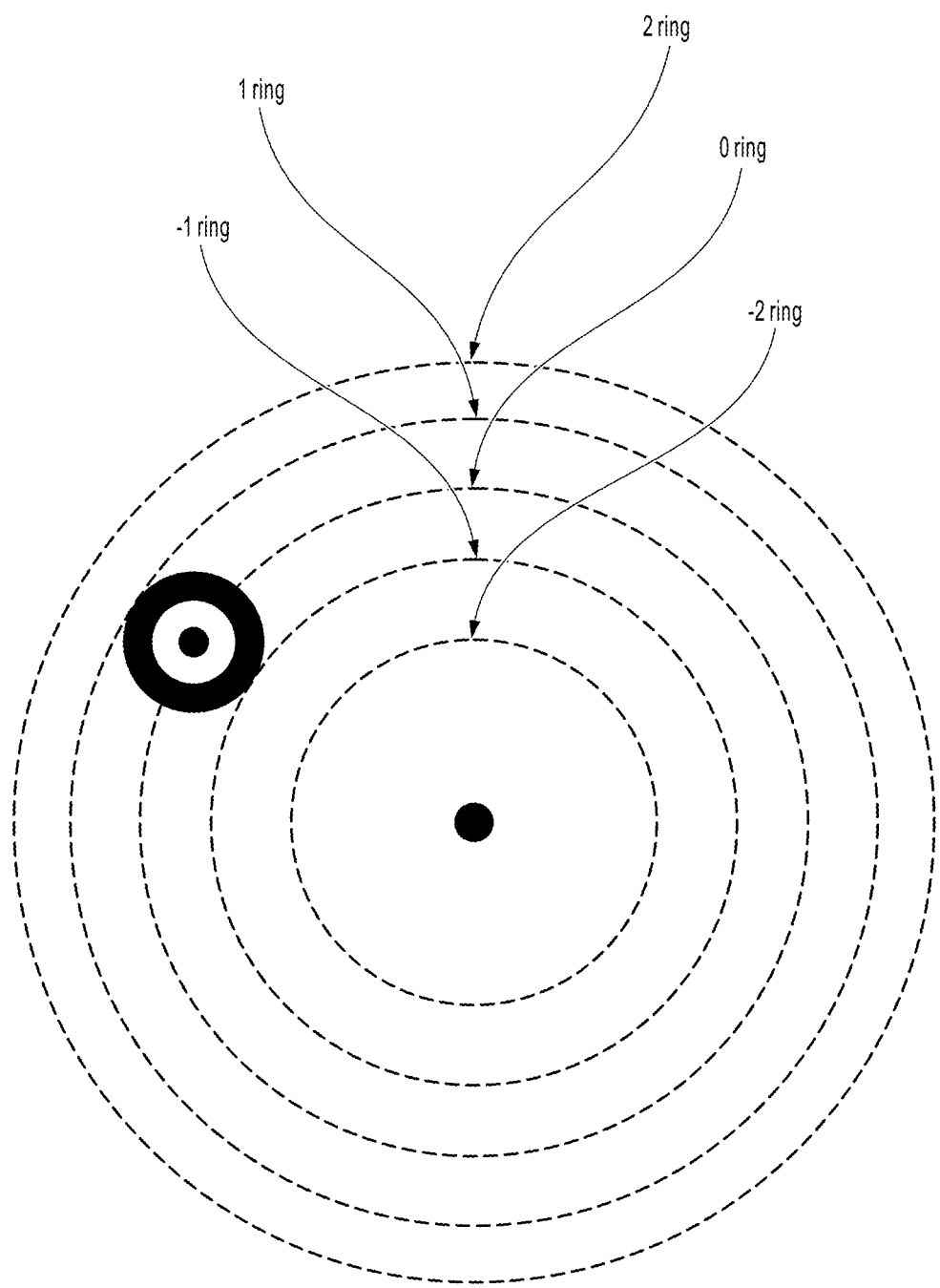
FIG. 5b is a schematic diagram illustrating a process of determining concentric circles of five different marks, according to an implementation of the present specification.

It can be seen from FIG. 5b that the concentric circle determined by using the specified radius is marked as a 0-ring, a concentric circle marked as a −1-ring and a concentric circle marked as a −2-ring can be obtained by reducing the specified radius by the predetermined step length, and a concentric circle marked as a 1-ring and a concentric circle marked as a 2-ring can be obtained by increasing the specified radius by a predetermined step length. The shape is an isometric concentric circle, in which a center of the position detection pattern is located on a 0 ring, and the isometric concentric circle is tangent to a concentric circle of a −1 ring and a 1 ring.

Further, when determining the position detection patterns, the server can determine the position detection pattern at a specified pole angle on the concentric circle determined based on the center and the specified radius. For ease of description, the following is described by using an example in which three concentric circles are determined, there are three position detection patterns whose shapes are isometric concentric circles, and there is one position detection pattern whose shape is a regular hexagon.

Figure 6A:
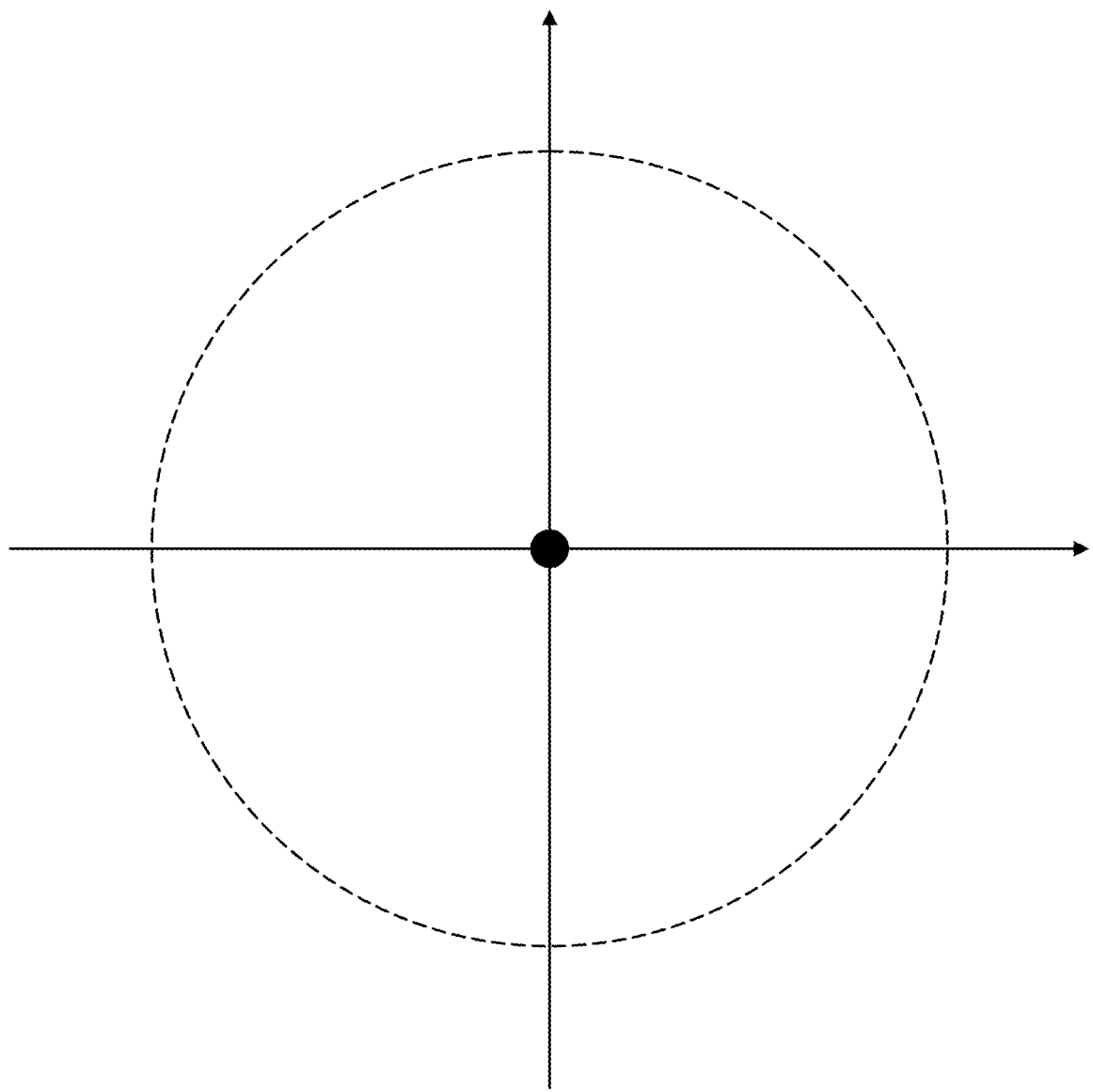
FIG. 6a to FIG. 6d are schematic diagrams illustrating processes of determining position detection patterns, according to an implementation of the present specification.
Figure 6B:
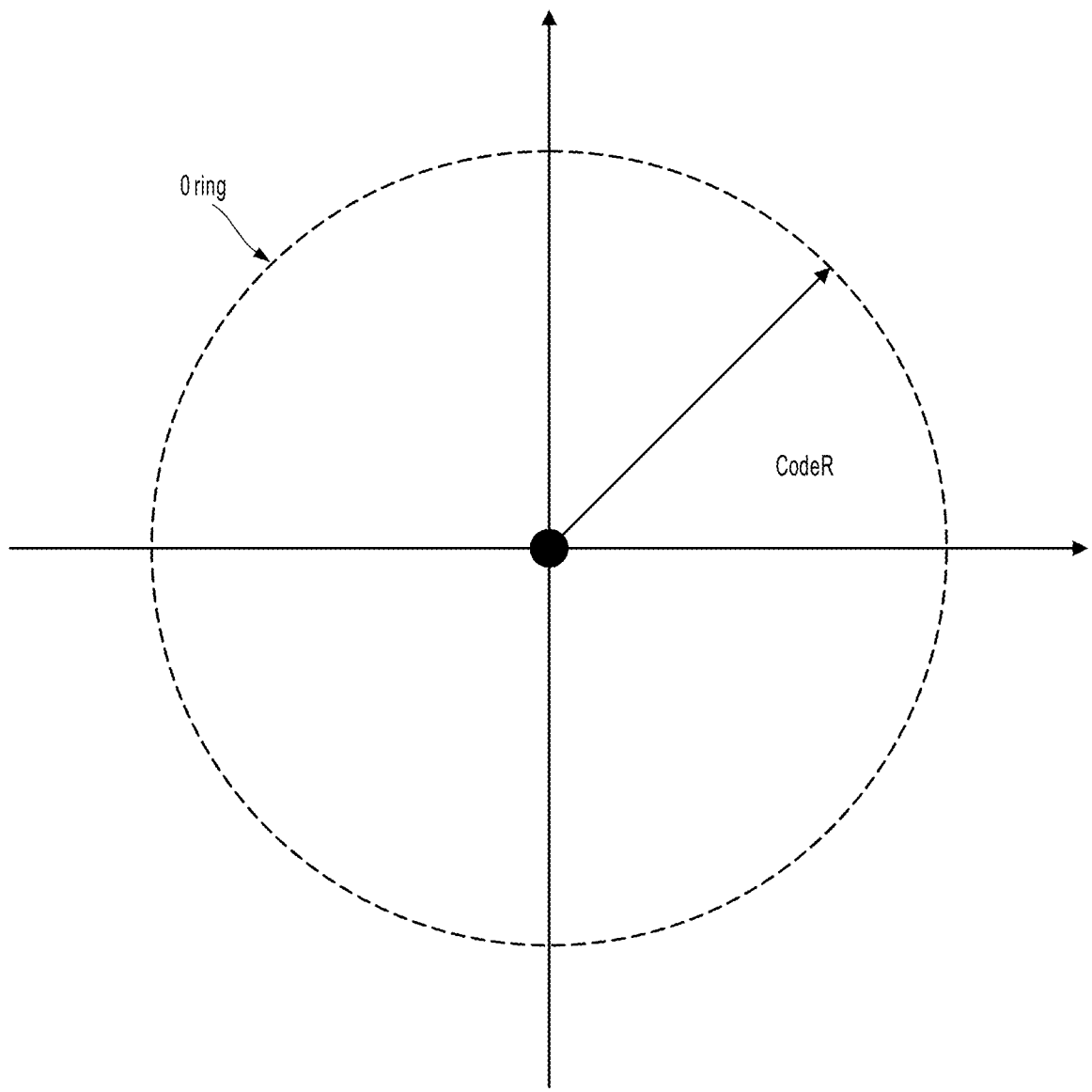
Figure 6C:
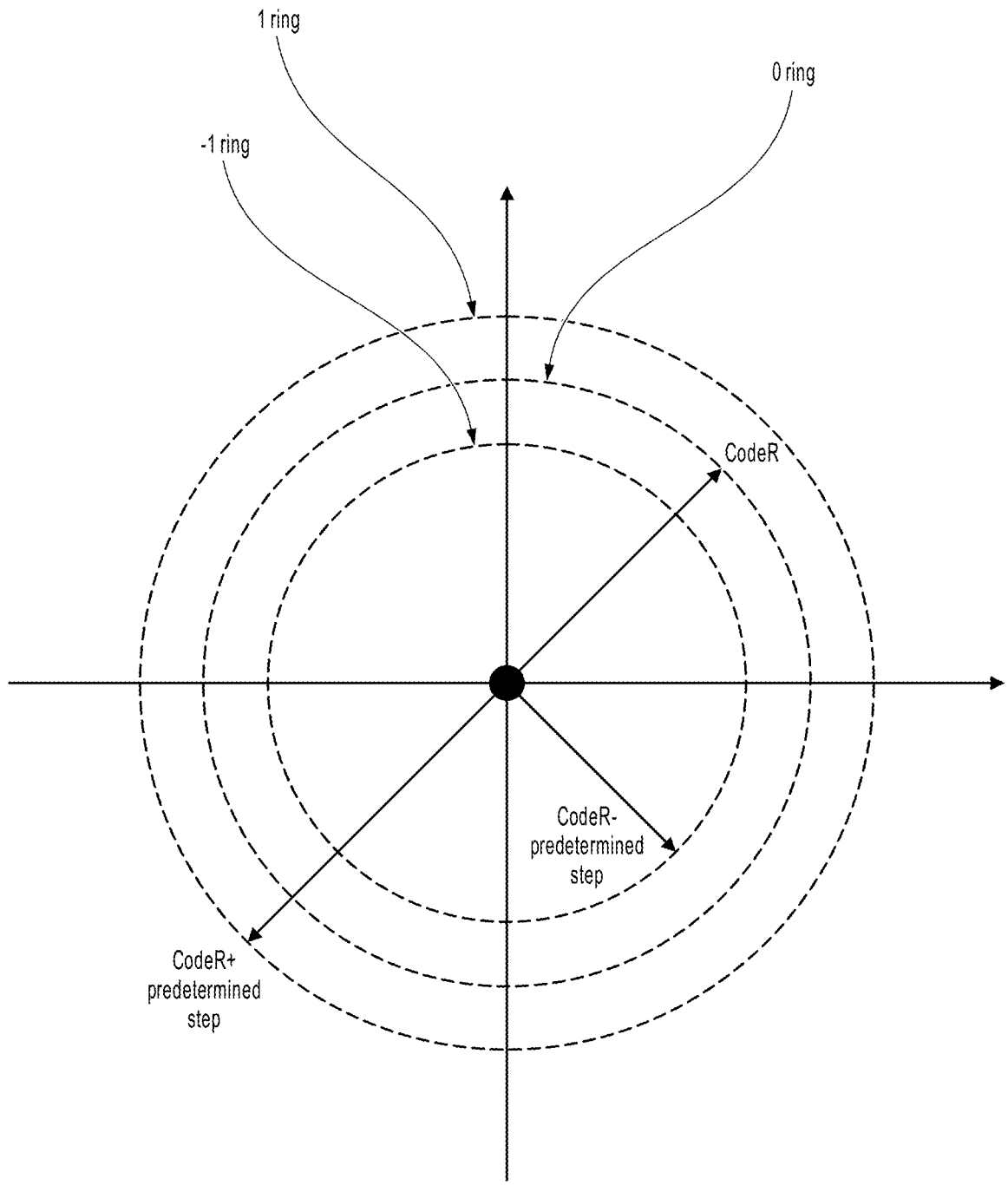
Figure 6D:
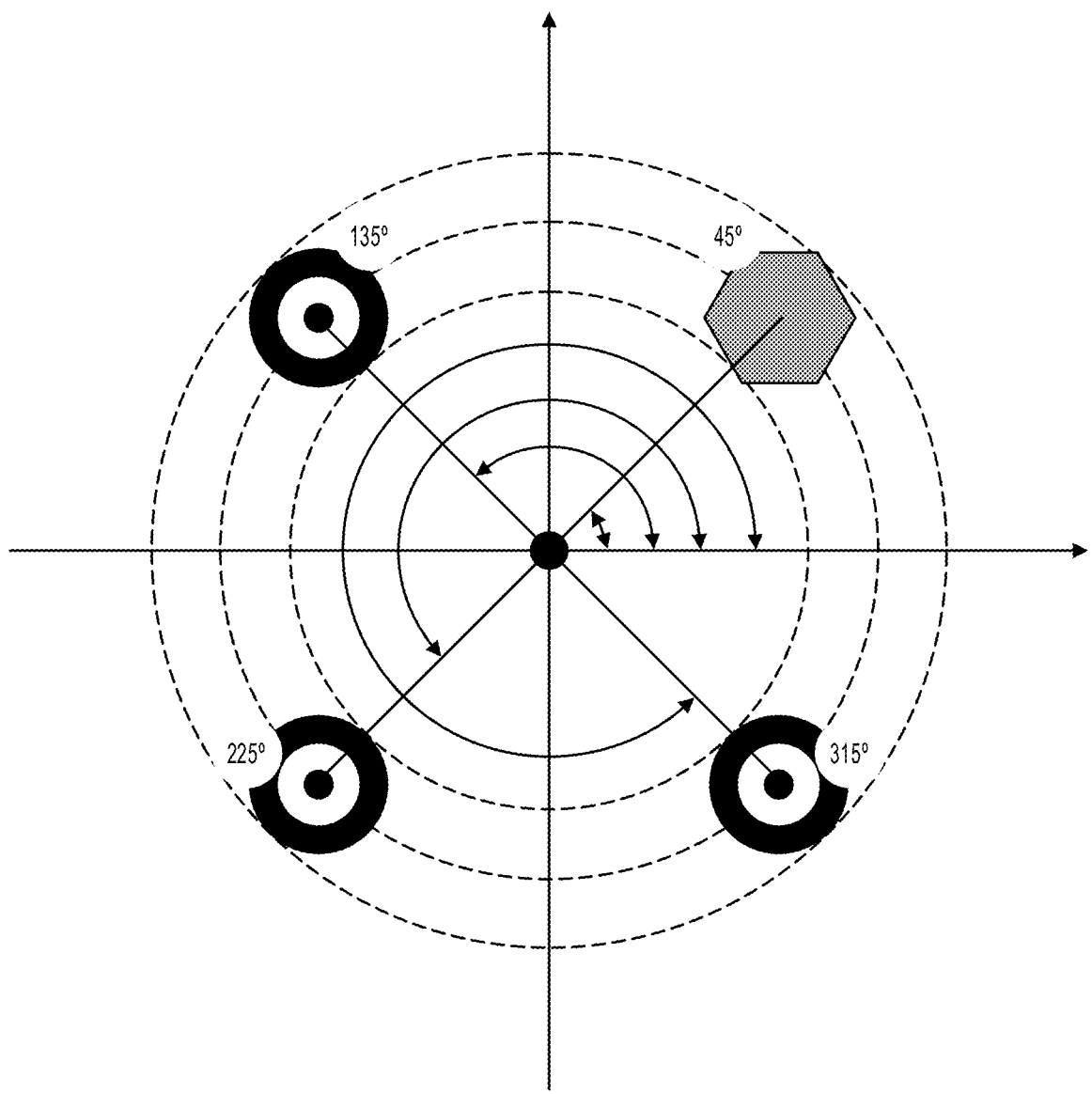

First, the server can establish a polar coordinate system by using the center determined in step S100 as an origin, as shown in FIG. 6a. Then, the circle can be determined based on the center and the specified radius. As shown in FIG. 6b, a specified radius of the determined circle is CodeR, and is marked as 0 ring. (In addition, the server may further determine, as described above, that the other two concentric circles are respectively marked as a −1 ring and a 1 ring, as shown in FIG. 6c), and then determine, based on polar angles (because a quantity of specified polar angles is also four because four position detection pictures are used as an example), several position detection patterns with equal spacing on the determined circle, as shown in FIG. 6d. The specified polar angles are respectively 45 degrees, 135 degrees, 225 degrees, and 315 degrees.

In addition, the previously described position detection patterns with an equal spacing indicate that spacing radians of the position detection patterns on a circle shown in FIG. 6b are equal, and are all 90 degrees.

S104. Determine a start pattern from each position detection pattern.

In this implementation of the specification, after determining the position detection pattern, the server may further determine a start graph in each position detection pattern, so that subsequent encoding can be performed on the determined concentric circles based on the position of the start graph.

Specifically, in step S102, several position detection patterns are determined according to several specified polar angles. Therefore, the server can determine the start graph from the position detection patterns according to the polar angle corresponding to each position detection pattern. The server can randomly select a specified polar angle to determine the start graph, or select a specified polar angle from specified polar angles to determine the start graph based on a requirement. It is not limited in the present specification, provided that in a process of identifying an identification code, a device of an identifying object may determine that one of the position detection patterns is the start graph.

Certainly, to improve identification efficiency and facilitate identification, the server generally can generate a position of the start pattern of the identification code for each position detection pattern. For example, in this implementation of the specification, the server can determine a position detection pattern whose corresponding polar angle is 135 degrees in the polar coordinate system shown in FIG. 6d as the start graph. For ease of description, subsequent description is also performed by using an example in which a 135-degree position detection pattern is determined as the start graph.

S106. Encode, on the several concentric circles based on the position of the start graph, N-ary characters corresponding to the to-be-encoded content to obtain an identification code.

In this implementation of the specification, after determining the position detection patterns and the start graph, the server can determine an encoding area (that is, an area for encoding) of the identification code, and perform encoding to obtain the identification code. In addition, because the server determines the concentric circles that are used for encoding in step S102, the server can encode, in a counter-clockwise or clockwise sequence, N-ary characters corresponding to the to-be-encoded content on each concentric circle to obtain the identification code.

Where, codes corresponding to adjacent and same characters in the N-ary characters form an arc line segment, a code corresponding to a character that is in the N-ary characters and that is different from adjacent characters is a point, code colors corresponding to different characters in the N-ary characters are different, and N is a positive integer not less than two. In addition, the point may be a circular point, or the arc line segment may be a circular arc line segment of a circular angle. A radius of the circular point is the same as a width of the circular arc line segment, and may be equal to a line thickness of a position detection pattern whose shape is an isometric concentric circle. Certainly, the present specification sets no limitation thereto.

Figure 7A:
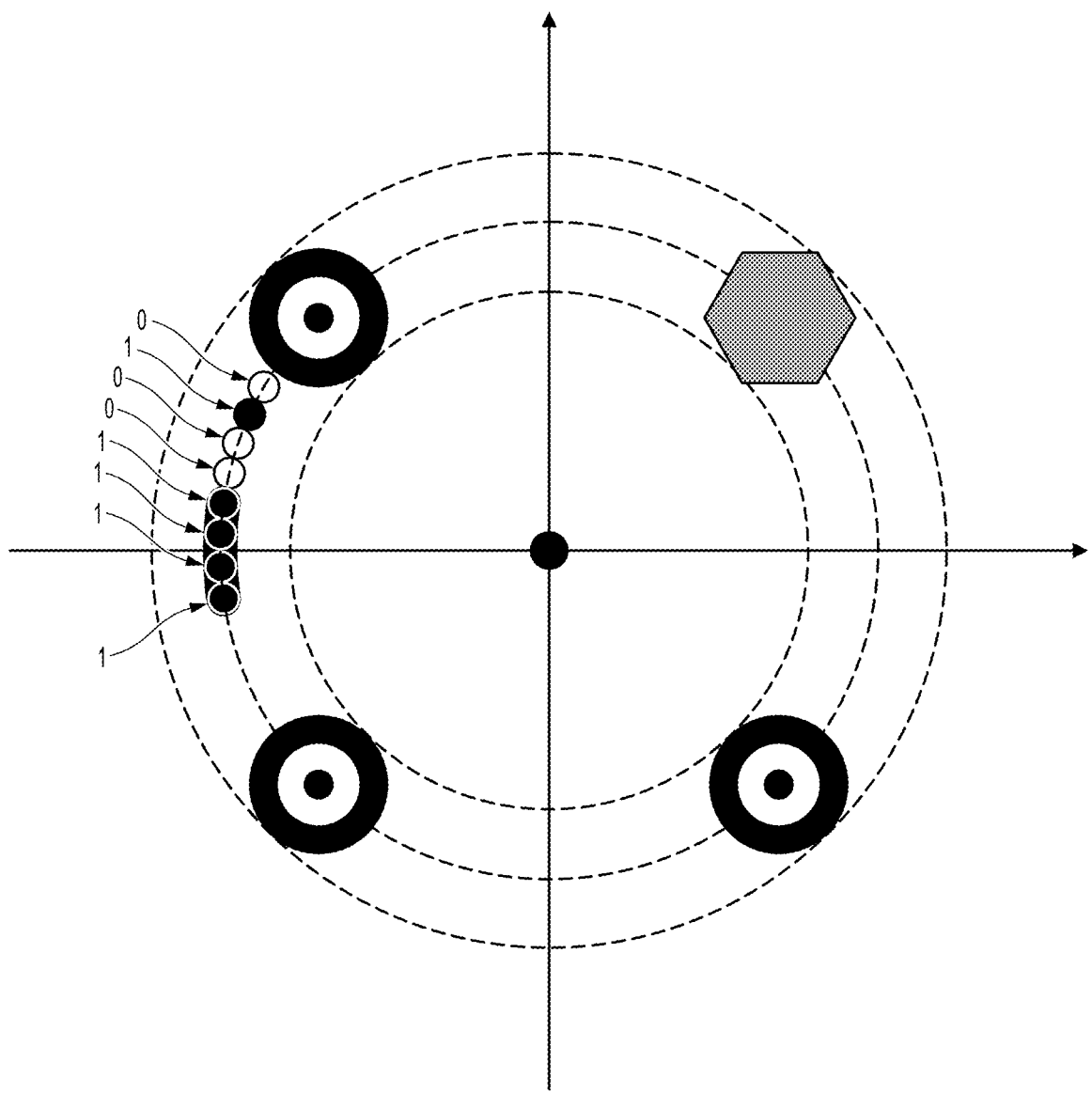
FIG. 7a and FIG. 7b are schematic diagrams illustrating patterns obtained through encoding, according to an implementation of the present specification.
Figure 7B:
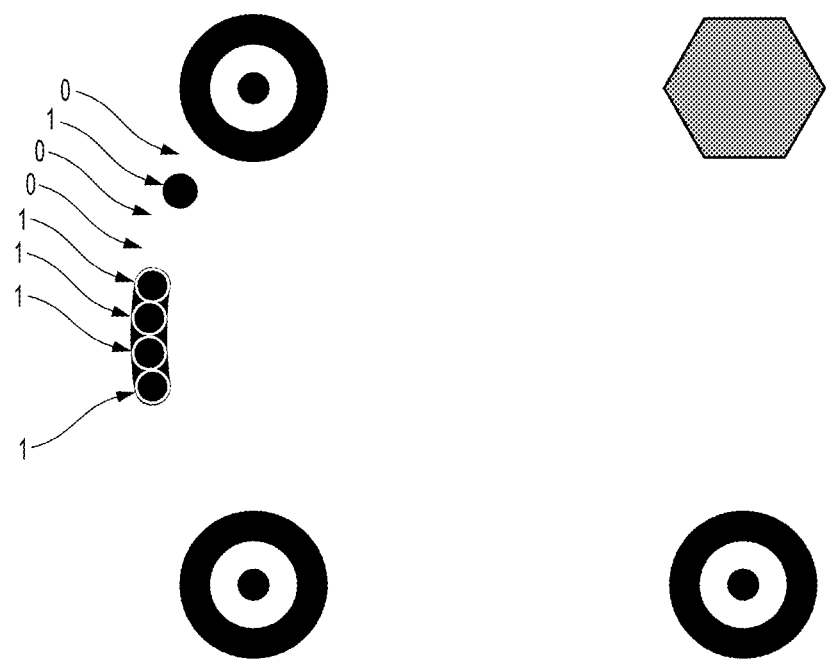

For example, that N is 2 is used as an example for description. It is assumed that a picture is used as to-be-encoded content. The server can convert the picture into a binary character by using the same method as in the existing technology. It is assumed that the binary character is "01001111 11 . . . ". After encoding is performed on the concentric circle, an arc line segment and points shown in FIG. 7a can be obtained. An example in which a color corresponding to the character "0" is white and a color corresponding to the character "1" is black is used as an example. For convenience of observation in the present specification, a black outline is added to the code corresponding to the character "0", and a white outline is added to the arc line segment to display the code corresponding to the character "1". Actual codes can be shown in FIG. 7b, that is, when actual display is performed, neither the black outline nor the white outline shown in FIG. 7a is displayed.

Figure 7C:
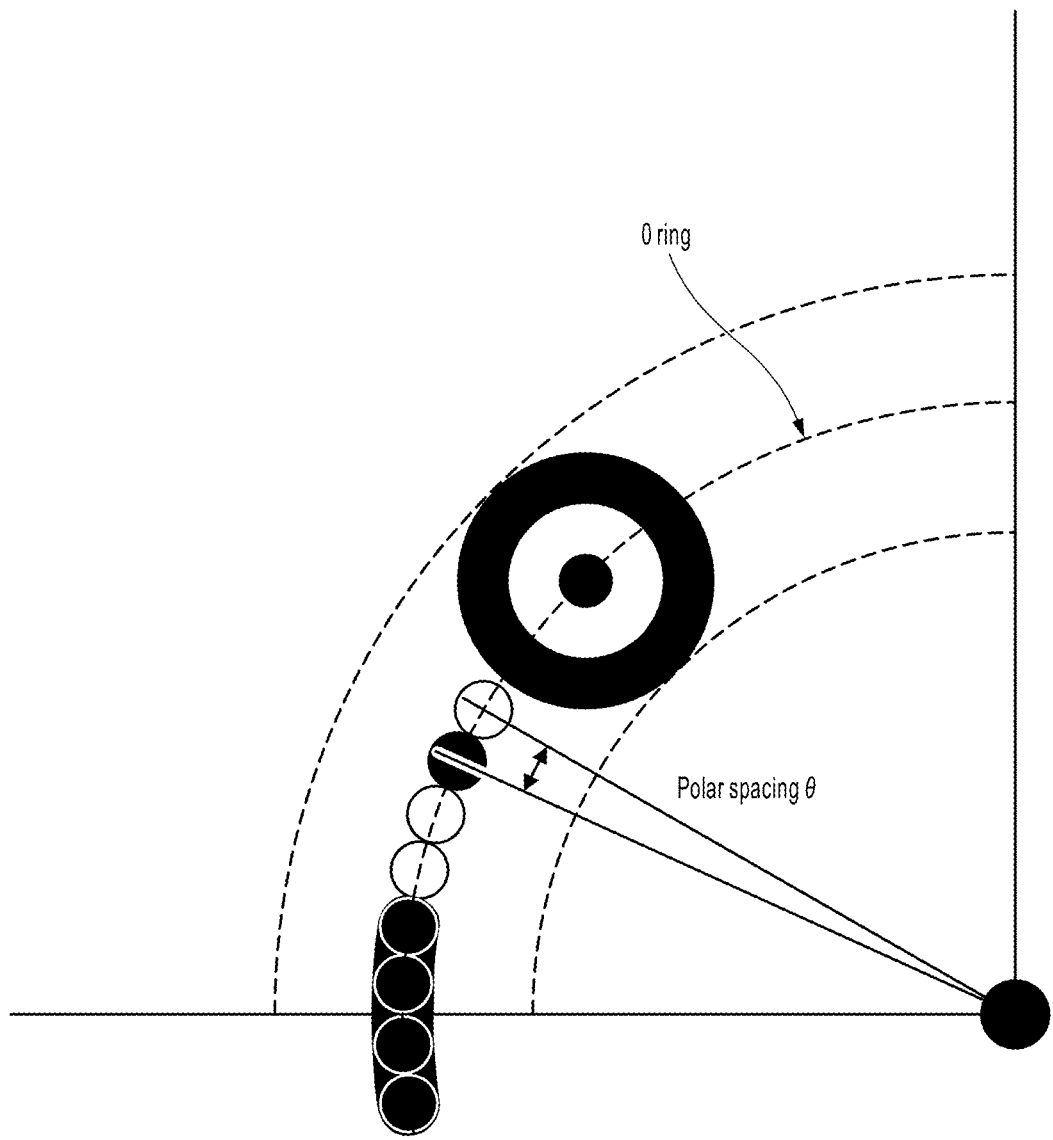
FIG. 7c is a schematic diagram illustrating a polar spacing, according to an implementation of the present specification.

In addition, in the present specification, when encoding the N-ary characters corresponding to the to-be-encoded content, the server can successively encode the N-ary characters corresponding to the to-be-encoded content at predetermined polar spacing (subsequently represented by $\theta$) for each concentric circle, so that spacing between two adjacent codes on any concentric circle of the to-be-encoded content are the same, as shown in FIG. 7c. FIG. 7c is a locally enlarged view of codes in the identification code. It can be seen that, on a concentric circle with an identifier of 0 ring, spacing between two adjacent codes have a same radian.

Specifically, the polar angle spacing can be determined based on a maximum quantity of codes on any concentric circle. For example, when a maximum quantity of codes on a concentric circle is 252, and 108 positions are occupied by each position detection pattern, that is, if no position detection pattern exists for occupation, a maximum quantity of codes on the concentric circle is 360. The predetermined polar spacing can determined through calculation based on the formula $\theta=360°/\beta$, where $\theta$ is the polar angle spacing, and $\beta$ is the maximum coding quantity.

In the present specification, for each concentric circle, when a quantity of concentric circles is 3, and a maximum quantity of codes that can be written on each concentric circle is 112 (including bits occupied by each position detection pattern), the N-ary characters corresponding to the to-be-encoded content can be successively encoded based on the formula $\theta=360°/\beta$, that is, based on a polar angle spacing of 3.214285714 degrees. Alternatively, when the quantity of concentric circles is 4, and a sum of a maximum quantity of codes that can be written on each concentric circle and a quantity of bits occupied by each position detection pattern is 128, the N-ary characters corresponding to the to-be-encoded content can be successively encoded based on the formula $\theta=360°/\beta$, that is, based on a polar angle spacing of 2.812 degrees. Alternatively, when the quantity of concentric circles is 5, and a sum of a maximum quantity of codes that can be written on each concentric circle and a quantity of bits that are occupied by each position detection pattern is 148, the N-ary characters corresponding to the to-be-encoded content can be successively encoded based on the formula $\theta=360°/\beta$, that is, based on a polar angle spacing of 2.432432432 degrees, and the N-ary characters corresponding to the to-be-encoded content are successively encoded. Certainly, the polar angle degree corresponding to the polar angle spacing can be set based on a requirement, which is not limited in the present specification.

Further, when the N-ary characters corresponding to the to-be-encoded content are encoded on each concentric circle, the following two methods are provided in the present specification.

Figure 8A:
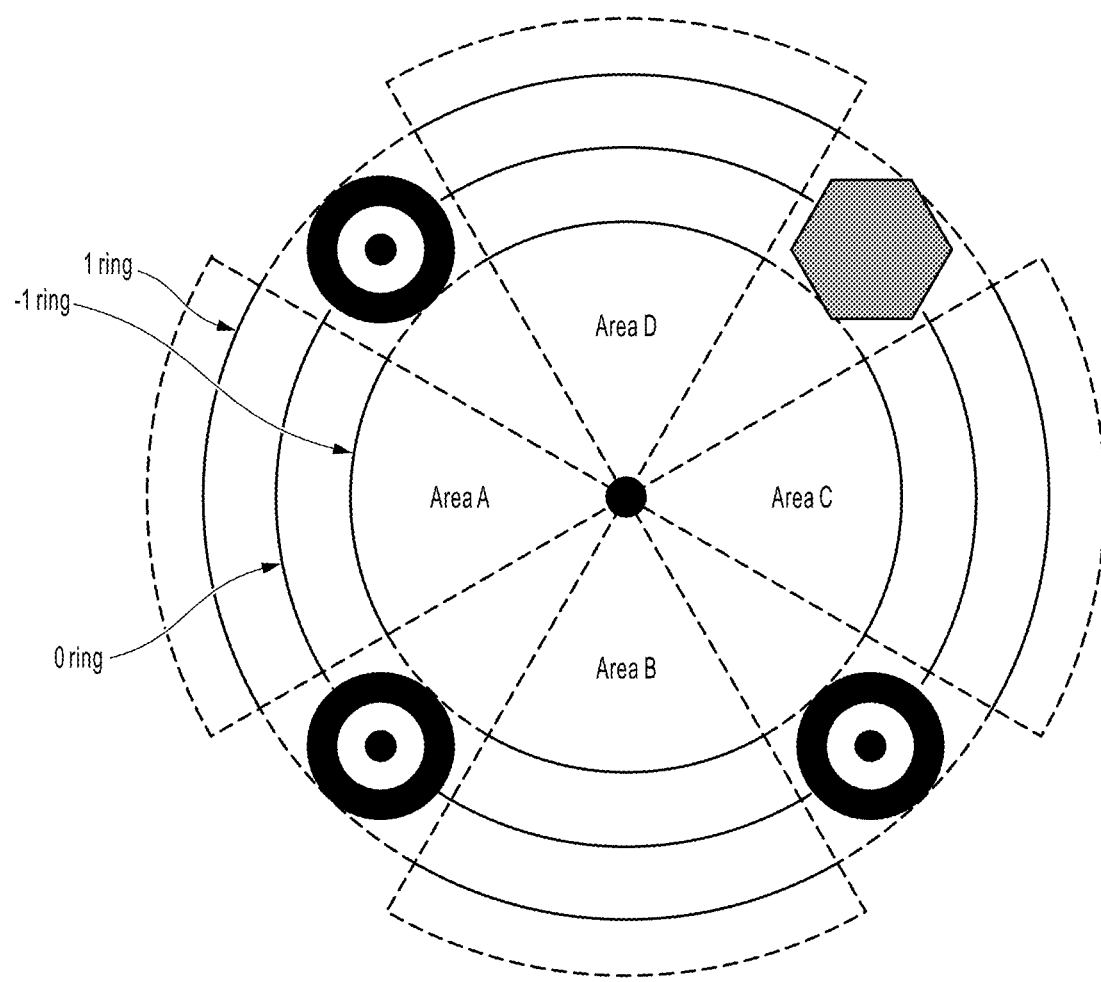
FIG. 8a is a schematic diagram illustrating how to divide concentric circles into a plurality of groups of concentric arcs, according to an implementation of the present specification.

Specifically, in the first method provided in the present specification, first, the server can divide each concentric circle into a plurality of groups of concentric arcs based on a position of each position detection pattern and the center determined in step S100, as shown in FIG. 8a. It can be seen from FIG. 8a that each concentric circle is divided into four groups of concentric arcs because there are four position detection patterns. Each concentric arc consists of a plurality of concentric arcs of different radii in a same polar angle range. Areas in which the plurality of groups of concentric arcs are located are respectively marked as areas A-D.

Next, the server can encode, based on the position of the start graph determined in step S104 and in a sequence of counterclockwise or clockwise, the N-ary characters corresponding to the to-be-encoded content on each concentric arc. In addition, when the currently written codes on the concentric arc is full, encoding continues on a next group of concentric arcs. In other words, each concentric arc is used as one writing unit. When one writing unit is full, a next writing unit is selected for writing.

Figure 8B:
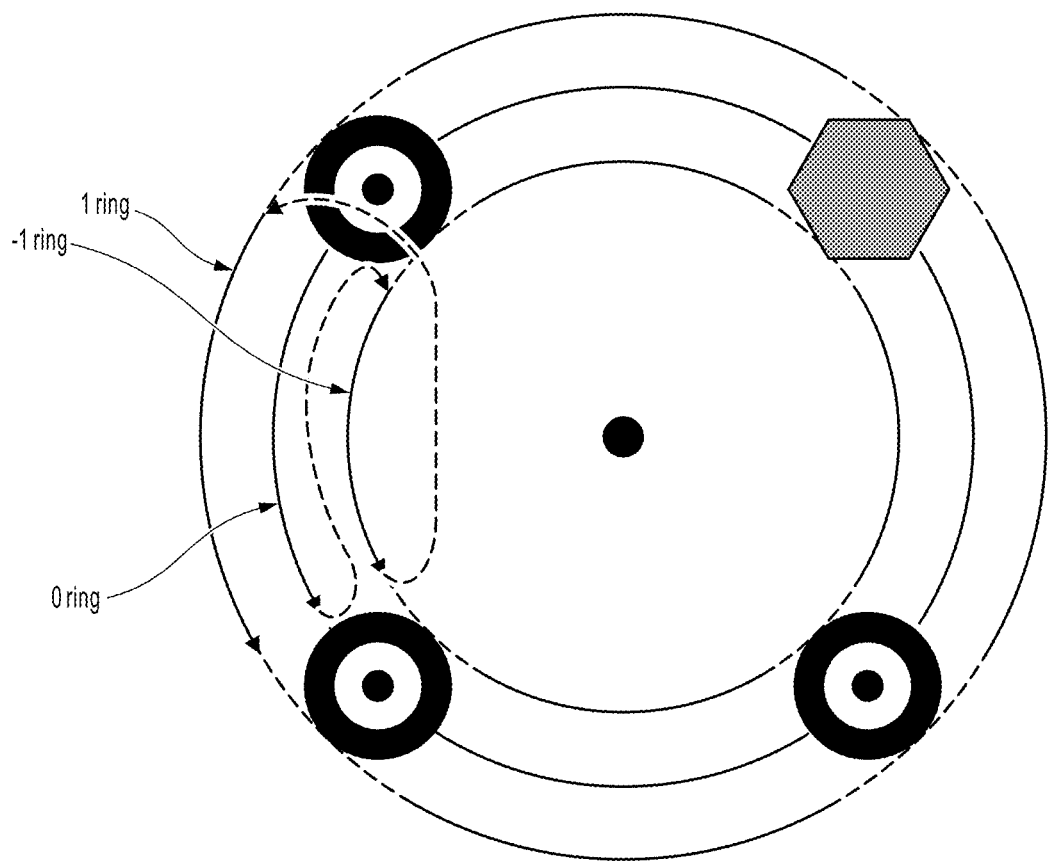
FIG. 8b and FIG. 8c are schematic diagrams illustrating methods for writing directions on a group of concentric circular arcs, according to an implementation of the present specification.
Figure 8C:
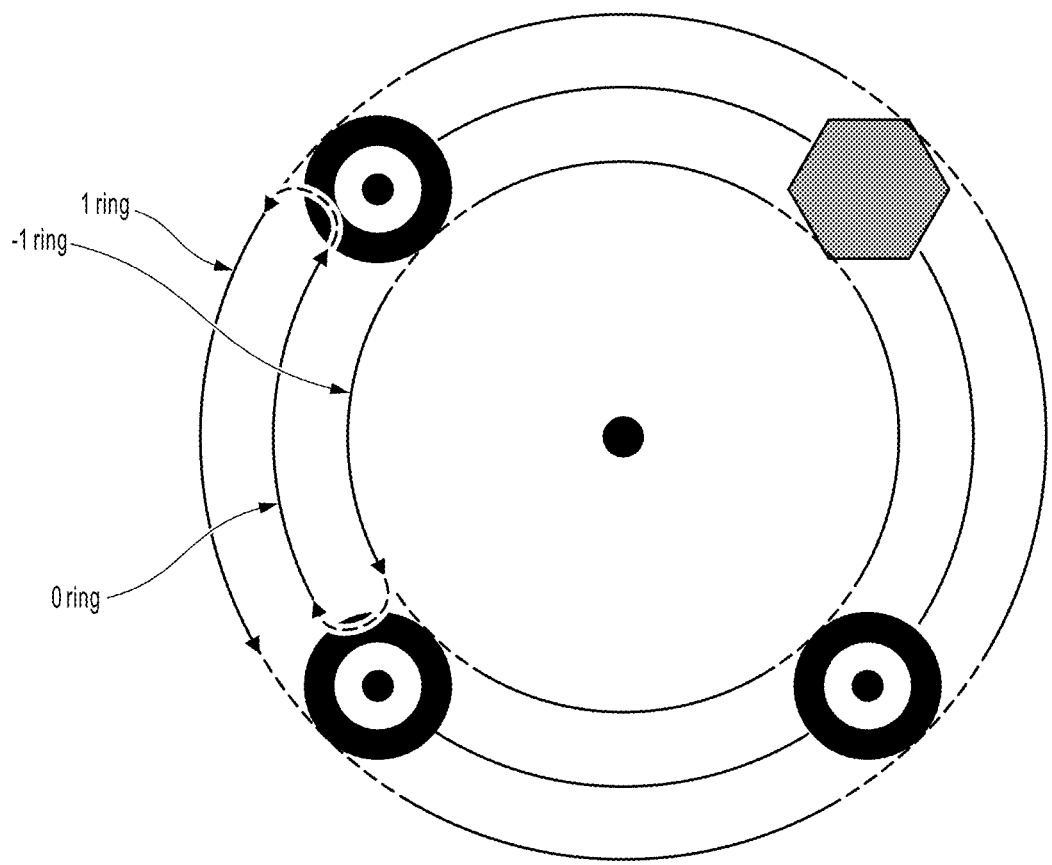

In addition, when writing is performed on a group of concentric arcs, the server can first perform writing on a concentric arc corresponding to a 0 ring in the group of concentric arcs, and then perform writing on a −1 ring, and finally perform writing on a 1 ring, as shown in FIG. 8b. A solid arrow represents a writing direction. In FIG. 8b, the writing direction is a counterclockwise direction, and a dotted arrow is connected to an end point of a concentric arc after the concentric arc is full and a start point of a next concentric arc when writing is continued. Alternatively, the server can successively perform writing in 1, −1, 0 rings on the group of concentric arcs or in another sequence. Alternatively, different writing directions are used on different concentric arcs. As shown in FIG. 8c, the server writes in a counterclockwise manner from the −1 ring, and then writes in a clockwise manner from the 0 ring, and finally writes in an counterclockwise manner from the 1 ring.

Figure 8D:
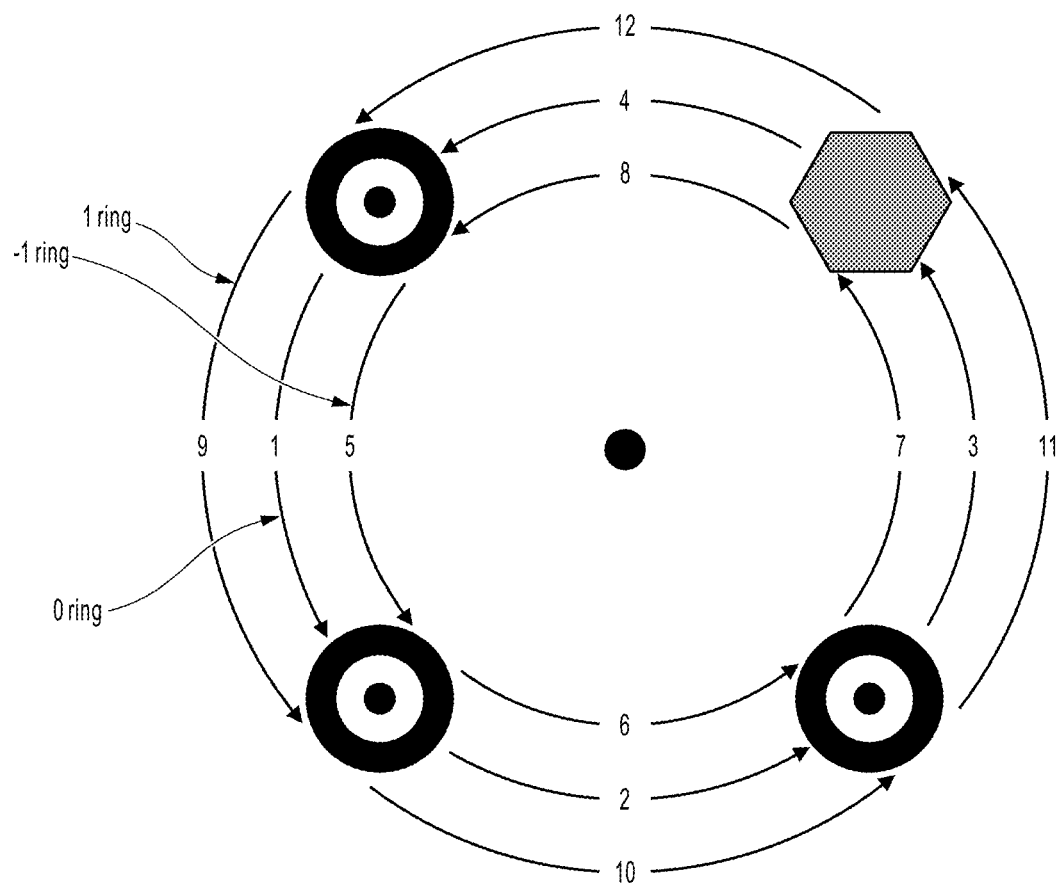
FIG. 8d is a schematic diagram illustrating another method for writing directions, according to an implementation of the present specification.

Further, in the second method provided in the present specification, the server can first select a specified concentric circle from several concentric circles, encode the N-ary characters corresponding to the to-be-encoded content on the selected concentric circle, and when the selected concentric circle is full, select, according to a predetermined concentric circle selection rule, a concentric circle that is not encoded to continue encoding. As shown in FIG. 8d, numerals 1 to 12 indicate a writing sequence. The specified concentric circle can be a concentric circle of a 0-ring, or the server selects any concentric circle to start writing. In this case, the selected concentric circle is a specified concentric circle. It is not limited in the present specification.

In FIG. 8d, the server does not divide the concentric circles into a plurality of groups of concentric arcs. Instead, the server uses one concentric circle as a writing unit, and selects a next concentric circle for writing after a concentric circle is full. In addition, on different concentric circles and different arc segments of a same concentric circle, the server can use different writing directions, which is not limited in the present specification.

Certainly, it is worthwhile to note that the previously described first and second methods can also be used in combination. Certainly, the previous two methods provided in the present specification are merely examples. A specific manner is not limited in the present specification, provided that the server can encode, on the concentric circles, the N-ary characters corresponding to the to-be-encoded content. For example, writing is first performed on an arc of a concentric circle whose polar angle is 0 to 90 degrees, and then writing is successively performed on an arc of a concentric circle whose polar angle is 90 to 180 degrees, 180 to 270 degrees, 270 to 360 degrees, and the like.

Further, in the present specification, the previously described to-be-encoded content includes functional data and a data code. During writing, the functional data can be written to a specified position, and the specified position can be set based on a requirement, which is not limited in the present specification.

In addition, to prevent the N-ary characters corresponding to the to-be-encoded content from being written too close to the position detection patterns, making the position detection patterns difficult to be identified, and content of the identification code difficult to be identified, During writing on each segment of concentric arc, the server can write on a concentric arc that is a distance from the position detection patterns.

Specifically, the server can encode the N-ary character corresponding to the to-be-encoded content by using the polar angle R as a start point, and when encoding is performed in a counterclockwise direction, $R=135°+\alpha \cdot \theta$ is used; when encoding is performed in a clockwise direction, $R=135°-\alpha \cdot \theta$ is used. $\alpha$ is the predetermined parameter, and $\theta$ is the predetermined polar angle spacing. $\alpha$ can be 3.5, 4, 5, or the like, which is not limited in the present specification. In addition, because a plurality of position detection patterns exist in the present specification, when the server writes on each group of concentric arcs, a start point at which writing is performed on each group of concentric arcs can be determined based on a formula $R=\theta'\pm\alpha \cdot \theta$. $\theta'$ is a specified polar angle, for example, 45 degrees, 135 degrees, 225 degrees, and 315 degrees.

Figure 9:
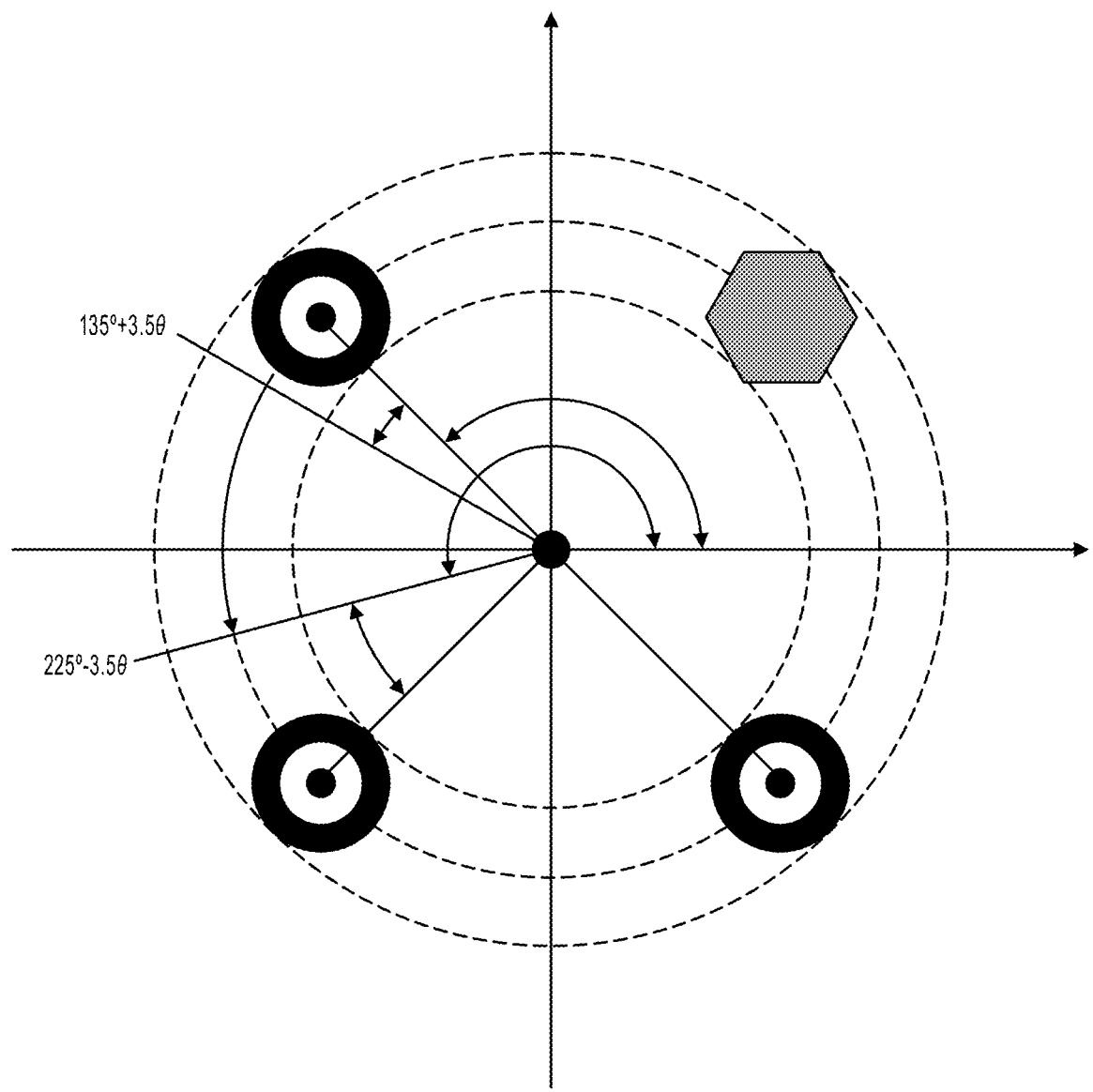
FIG. 9 is a schematic diagram illustrating a writing start point and a writing end point, according to an implementation of the present specification.

Further, the encoding end point can also be determined by using the previously described formula $R=\theta'\pm\alpha \cdot \theta$. For example, when writing is performed on concentric arcs from 135 degrees to 225 degrees, the polar angle of the writing start point is 135 degrees plus $3.5\theta$, and the polar angle of the writing end point is 225 degrees minus $3.5\theta$, as shown in FIG. 9.

Figure 10:
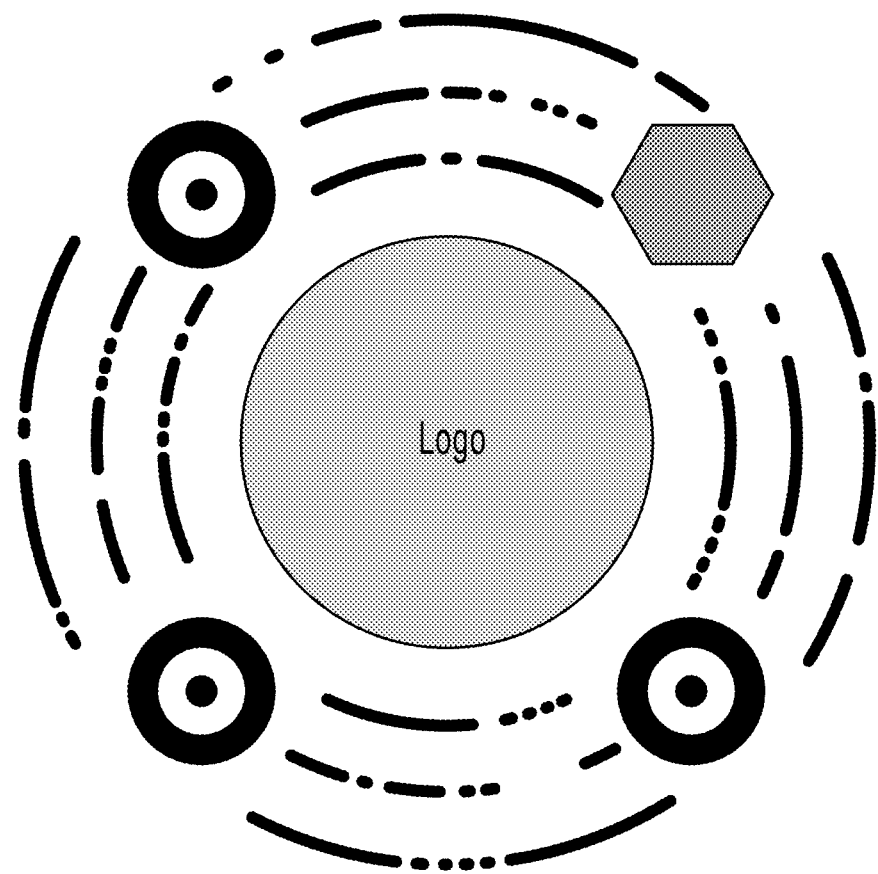
FIG. 10 is a schematic diagram illustrating an identification code obtained after writing, according to an implementation of the present specification.

It is worthwhile to note that in the present specification, the identification code can further include non-encoded content in an area surrounded by a concentric circle with a smallest radius in the previously described several concentric circles. The non-encoded content includes at least one of a text, a symbol, and a pattern. The non-encoded content can be a logo, a user's avatar, or the like, and is used to improve the brand recognition of the identification code. As shown in FIG. 10, the CodeR can be set based on a requirement. When the CodeR is larger, the area in the center of the identification code used for filling the non-encoded content is larger, and the user can identify the non-encoded content included in the identification code more easily.

By using the identification code generation process provided in the present specification, the server can generate a new identification code that is different from a style of the identification code generated in the existing technology. The identification code generated by using the present specification is encoded in a form of a circular arc segment and an origin, which can provide better user experience for the user.

In addition, in the implementation of the present specification, colors corresponding to different characters in the N-ary characters corresponding to the to-be-encoded content are different, and colors corresponding to different characters are not limited in the present specification. In addition, a quantity of colors may be the same as a value of N. For example, binary characters can correspond to two different colors, and decimal characters can correspond to 10 different colors. In addition, the two different colors corresponding to the binary characters are not limited to black and white, and can also be black and yellow, or white and red, etc.

Figure 11:
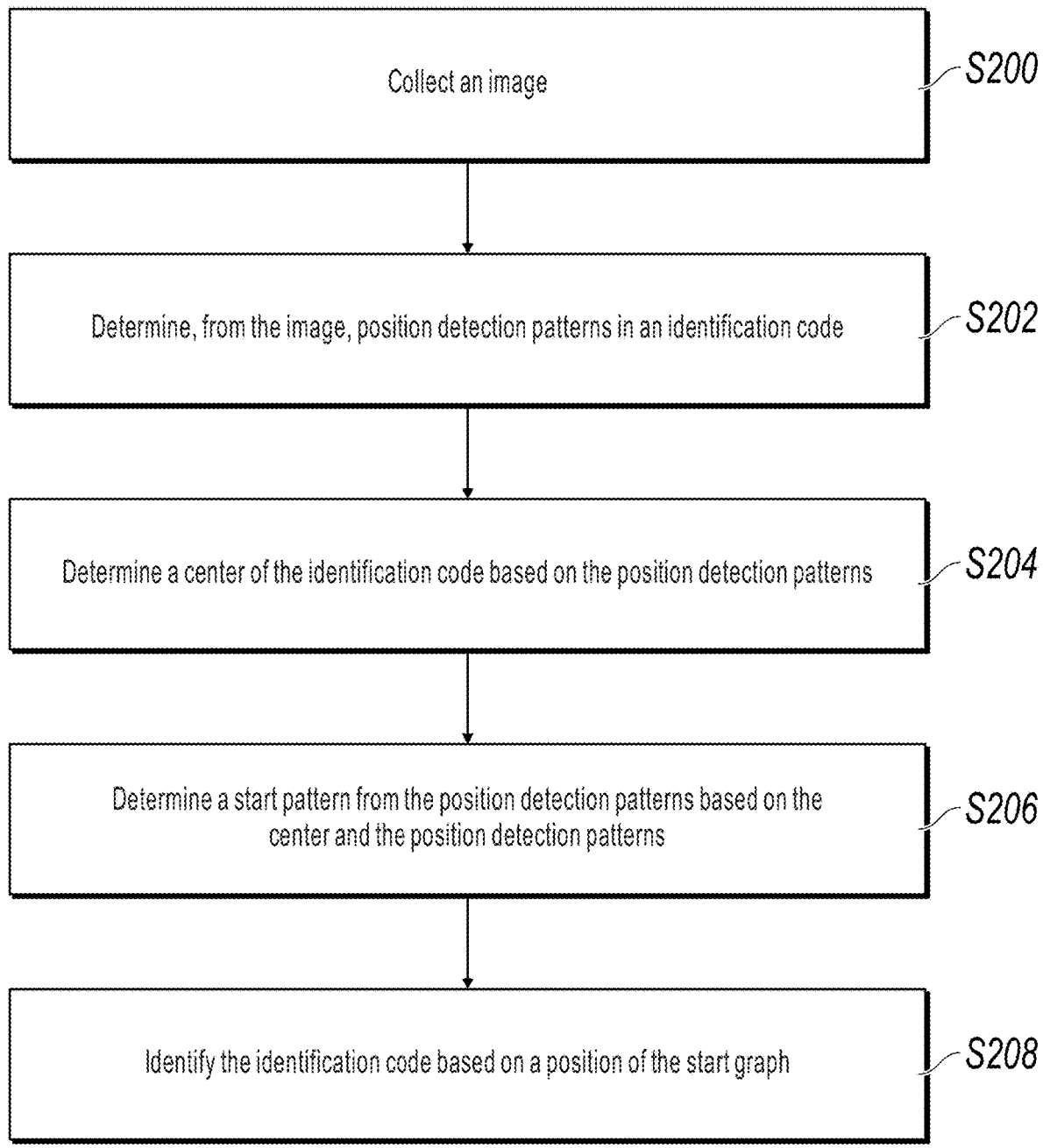
FIG. 11 shows an identification code identification process according to an implementation of the present specification.

Based on the previously described identification code generation processes and schematic diagrams shown in FIG. 1 to FIG. 10, the implementations of the specification further provide an identification code identification process, as shown in FIG. 11.

FIG. 11 shows a process of identifying an identification code according to an implementation of the specification, which may specifically include the following steps:

S200. Collect an image.

Similar to the existing technology, in a process of identifying an identification code, an image needs to be first collected.

In the implementation of the present specification, the image can be collected by an end-user device, and the end-user device can be a device such as a mobile device, a tablet computer, or a personal computer connected to a camera. It is not limited in the present specification, provided that the end-user device can collect an image.

Further, it is assumed that the collected image includes the identification code generated according to FIG. 1 for further description.

In addition, generally, identification codes generated by different methods also differ in identification methods. Therefore, the end-user device can obtain the method for identifying an identification code in advance.

S202. Determine, from the image, position detection patterns in an identification code.

S204. Determine a center of the identification code based on the position detection patterns.

In this implementation of the specification, after collecting the image, the end-user device can determine, from the image, the position detection patterns corresponding to the identification code, so that subsequently a position of the identifier in the image is further determined (which can be specifically determining a position of a code area of the identification in the image) according to the position detection patterns, so as to obtain content in the identification code.

Specifically, the end-user device can determine, from the collected image by using a method similar to that in the existing technology, several isometric concentric circles suspected to be position detection patterns. Different from the method for determining a position detection pattern in the existing technology (that is, all pixels in an image are traversed to determine that a ratio of heterochromatic pixels in a vertical direction and a horizontal direction is 1:1:3:1), the position detection pattern in the present specification includes an isometric concentric circle, and therefore the end-user device can determine several isometric concentric circles by using a ratio of heterochromatic pixels in 1:1:1:1:1.

In addition, the end-user device can further determine the position detection patterns from several isometric concentric circles suspected to be the position detection patterns by using the same method as in the existing technology. Different from data obtained in the existing technology, in data that needs to be obtained by the end-user device, a unit length difference of a position detection pattern is a radius difference of an isometric concentric circle, and an included angle and a length deviation of the position detection pattern are the same as those of the existing technology.

Further, in this implementation of the specification, the position detection pattern can further include a regular hexagon that is used for auxiliary positioning. Therefore, after determining several isometric concentric circles, the end-user device can further determine several groups of isometric concentric circles based on a quantity of position detection patterns of the identification code. The end-user device can determine, according to the identification method for pre-obtaining the identification code, the quantity of position detection patterns of the identification code (that is, a quantity of position detection patterns that include the identification code in the identification method).

For each group of isometric concentric circles, a first position is determined based on a position of each isometric concentric circle in the group of isometric concentric circles, and it is determined whether there is a regular hexagon in the first position. If yes, it is determined that the group of isometric concentric circles and the regular hexagon are position detection pictures of the identification code; or if no, it is determined that the group of isometric concentric circles is not in a one-to-one correspondence with the position detection patterns of the identification code, that is, the group of isometric concentric circles are not position detection pictures.

For example, it is assumed that the end-user device determines, by using a method for determining a position detection pattern, that four isometric concentric circles (marked as a to d respectively) meet a condition of the position detection pattern. Further, it is assumed that a quantity of position detection patterns of the identification code is 3, and the end-user device can establish a group shown in Table 1.

TABLE 1

| Groups | Identifiers of included isometric concentric circles |
|---|---|
| 1 | abc |
| 2 | abd |
| 3 | acd |
| 4 | bcd |

Specifically, the end-user device determines a circle by using a position of each group of isometric concentric circles in the image. A polar coordinate system is established based on several specified polar angles (for example, 45 degrees, 135 degrees, 225 degrees, and 315 degrees) and the positions of the group of isometric concentric circles on the circle. It is determined whether there is a regular hexagon at a first position corresponding to any specified polar angle on the circle. The end-user device can determine, by using an existing polygon area filling algorithm, whether a regular hexagon exists in the first position, or can determine, by using another algorithm, whether a regular hexagon exists in the first position, which is not limited in the present specification. For example, if it is determined that isometric concentric circles exist at 45 degrees, 135 degrees, and 225 degrees of the circle, 315 degrees of the circle are the first position.

Certainly, in the previously described identification process, a method the same as that in the existing technology can be used to correct the distortion, the tilt, etc. of the image. A specific method is not described in the specification. An edge of the regular hexagon is a straight line, and therefore the regular hexagon can be used for reference during correction.

S206. Determine a start pattern from the position detection patterns based on the center and the position detection patterns.

In this implementation of the specification, after determining the position detection patterns, the end-user device can determine a start graph of the position detection pattern according to a method for identifying an identification code provided in advance by the server.

For example, when the start graph is a position detection pattern corresponding to a position of a 135-degree polar angle, the end-user device can determine the start graph based on the polar coordinate system established in step S204.

S208. Identify the identification code based on the position of the start graph.

In this implementation of the specification, the end-user device can determine encoding areas of the identification code in the image based on the determined position detection patterns and the determined center, and obtain, based on the position of the start graph in a clockwise or counterclockwise sequence, encoded content corresponding to the identification from the determined encoding areas.

Specifically, the same as the existing technology, when identifying the identifier, the end-user device can first obtain content corresponding to the functional data in the encoded content of the identification. Therefore, in the present specification, the end-user device can first determine a second position from the encoding areas based on the position of the start graph, then identify, from the second position, the functional data included in the encoded content, and obtain, from the determined encoding areas, the encoded content corresponding to the identification code based on the identified functional data.

Where, the second position is a specified position to which functional data is written when the identification code is generated in step S106 in the previous identification code generation process provided in FIG. 2.

For example, it is assumed that versions of a plurality of identification codes are determined according to different identification code generation manners, and the identification code version is included in functional data. After identifying the functional data, the end-user device can determine, according to the version of the identification code included in the functional data, the identification manner corresponding to the identification code, so as to identify the identification code in the determined identification manner.

In addition, in a process of generating the identification code shown in FIG. 2, in step S106, the present specification provides two methods for encoding the N-ary characters corresponding to the to-be-encoded content on each concentric circle, so that versions (respectively referred to as the first version and the second version) of two identification codes can be determined. Therefore, correspondingly, the end-user device can also determine a version of the identification code by identifying the functional data in the identification code, and determine the identification method based on the version of the identification code.

Specifically, when the identified functional data indicates that the identification code is identified by using the first identification method (that is, when the identification code is the identification code of the first version), the end-user device can first divide the concentric circles into a plurality of groups of concentric arcs based on the determined position detection patterns and the center, and then sequentially identify the identification code on each group of concentric arcs in a clockwise or counterclockwise sequence based on the position of the start graph.

When the identified functional data indicates that the identification code is identified by using the second identification method, concentric circles are successively selected from the several concentric circles according to the predetermined concentric circle selection rule, and the identification code is identified on the selected concentric circles in a clockwise or counterclockwise sequence. Specifically, the method used to identify the identification code can be the same as that in the existing technology, for example, grayscale processing of identification code information pixels, removing a noise of the identification code information pixels, and binarization of the identification code information pixels, etc. It is not limited in the present specification. The information pixel is a pixel corresponding to a code in the identification code.

It is worthwhile to note that all the steps of the method provided in Implementation 1 can be executed by the same device, or the method can be performed by different devices. For example, step S102 and step S104 can be executed by device 1, and step S106 and step S108 can be executed by device 2. For another example, step S102 and step S106 can be executed by device 2, and step S104 and step S108 can be executed by device 1. The specified implementations of the present disclosure have been described above. Other implementations fall within the scope of the following claims. In some cases, the actions or steps recited in the claims can be performed in a sequence different from that in the implementations and still achieve desirable results. In addition, the processes described in the figures do not necessarily require the particular order shown or sequential order, to achieve desirable results. In certain implementations, multitasking and parallel processing are also possible or may be advantageous.

Figure 12:
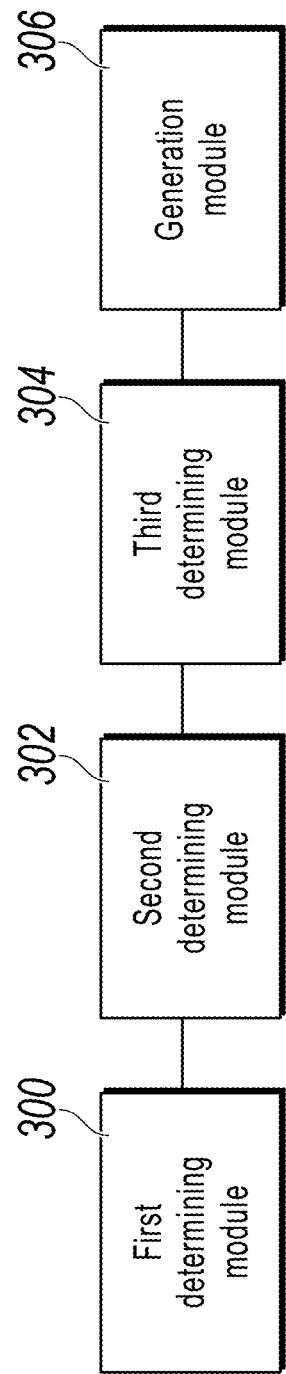
FIG. 12 is a schematic structural diagram illustrating an identification code generation apparatus, according to an implementation of the present specification.

Based on the method for generating an identification code shown in FIG. 1, the implementations of the present specification further provide an identification code generation apparatus, as shown in FIG. 12.

FIG. 12 is a schematic structural diagram illustrating an identification code generation apparatus, according to an implementation of the present specification. The apparatus includes: a first determining module 300, configured to determine a center; a second determining module 302, configured to determine several concentric circles based on the center, and determine, based on the center and a specified radius, several position detection patterns whose distance from the center is the radius, where the several position detection patterns are not completely the same; a third determining module 304, configured to determine a start pattern from the position detection patterns; and a generation module 306, configured to encode, on the concentric circles based on a position of the start pattern, N-ary characters corresponding to to-be-encoded content to obtain an identification code, where codes corresponding to adjacent and same characters in the N-ary characters form an arc line segment, a code corresponding to a character that is different from both adjacent characters in the N-ary characters is a point, codes corresponding to different characters in the N-ary characters have different colors, and N is a positive integer not less than two.

The second determining module 302 is configured to: select a concentric circle whose radius is the specified radius, and determine several position detection patterns on the selected concentric circle; or select any concentric circle from the concentric circles, and determine several position detection patterns on the selected concentric circle.

The second determining module 302 obtains several radii by increasing and/or reducing the radius by a predetermined step, and determines several concentric circles based on the center and the obtained several radii.

The third determining module 304 establishes a polar coordinate system by using the center as an origin, determines a circle based on the center and the specified radius, and determines, based on several specified polar angles, several position detection patterns with equal spacing on the determined circle.

The third determining module 304 determines the start pattern from each position detection pattern based on the polar angles corresponding to the position detection patterns.

The several specified polar angles include: 45 degrees, 135 degrees, 225 degrees, and 315 degrees.

The third determining module 304 determines a position detection pattern corresponding to the polar angle of 135 degrees as the start pattern.

The position detection pattern includes isometric concentric circles and a regular hexagon. A line thickness of each concentric circle in the isometric concentric circles is a predetermined width, and line colors of two adjacent concentric circles in the isometric concentric circles are different.

The generation module 306 encodes, on the concentric circles based on the position of the start pattern, the N-ary characters corresponding to the to-be-encoded content in a counterclockwise or clockwise direction.

The generation module 306 divides the concentric circles into a plurality of groups of concentric arcs based on the positions of the position detection patterns and the center; encodes N-ary characters corresponding to the to-be-encoded content on each group of concentric arcs in a counterclockwise or clockwise sequence based on the position of the start graph; and continues to perform encoding on a next group of concentric arcs when the group of concentric arcs is full.

The generation module 306 selects a concentric circle from the concentric circles according to a predetermined concentric circle selection rule, encodes the N-ary characters corresponding to the to-be-encoded content on the selected concentric circle, and when the selected concentric circle is full, continues to select, according to the concentric circle selection rule, a concentric circle that is not encoded for encoding.

The to-be-encoded content includes functional data, and the generation module 306 encodes the N-ary characters corresponding to the functional data to a specified position.

The generation module 306 successively encodes, for each concentric circle, the N-ary characters corresponding to the to-be-encoded content based on a predetermined polar spacing, so that spacing of two adjacent codes on the concentric circle are the same.

The generation module 306 encodes, on the several concentric circles, the N-ary characters corresponding to the to-be-encoded content by using a polar angle R as a start point in a counterclockwise or clockwise direction. When encoding is performed in a counterclockwise direction, $R=135°+\alpha.\theta$ is used; and when encoding is performed in a clockwise direction, $R=135°-\alpha.\theta$ is used. $\alpha$ is the predetermined parameter, and $\theta$ is the predetermined polar angle spacing.

The predetermined polar spacing is determined based on a maximum quantity of codes on any concentric circle.

The first determining module 300 determines a predetermined quantity of concentric circles based on the center, where the predetermined quantity includes at least one of 3, 4, and 5.

The identification code further includes non-encoded content. The non-encoded content is located in an area surrounded by a concentric circle with a smallest radius in the several concentric circles, and the non-encoded content includes at least one of a text, a symbol, and a pattern.

Figure 13:
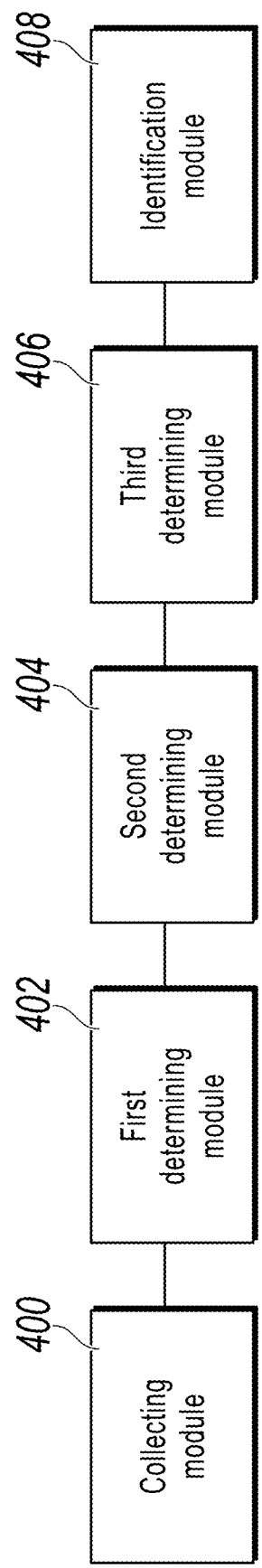
FIG. 13 is a schematic structural diagram illustrating an identification code identification apparatus, according to an implementation of the present specification.

Based on the method for generating an identification code shown in FIG. 11, the implementations of the present specification further provide an identification code identification apparatus, as shown in FIG. 13.

FIG. 13 is a schematic structural diagram illustrating an identification code identification apparatus, according to an implementation of the present specification. The apparatus includes: a collecting module 400, configured to collect an image; a first determining module 402, configured to determine, from the image, position detection patterns in an identification code; a second determining module 404, configured to determine a center of the identification code based on the position detection patterns; a third determining module 406, configured to determine a start pattern from the position detection patterns based on the center and the position detection patterns; and an identification module 408, configured to identify the identification code based on a position of the start pattern, where the identification codes include codes on several concentric circles, codes corresponding to adjacent and same characters in the coding content form an arc line segment, a code corresponding to a character that is different from adjacent characters in the coding content is a point, and coding colors corresponding to different characters in the coding content are different.

The position detection pattern includes an isometric concentric circle and a regular hexagon.

The first determining module 402 identifies several groups of isometric concentric circles from the image; determines a first position based on a position of each isometric concentric circle in each group of isometric concentric circles; determines whether a regular hexagon exists in the first position; and if yes, determines that the group of isometric concentric circles is a position detection pattern; or if no, determines that the group of isometric concentric circles is not a position detection pattern.

The third determining module 406 establishes a polar coordinate system based on the position detection patterns and a position of the center in the image by using the center as an origin, and determines a position detection pattern whose corresponding polar angle is 135 degrees as a start graph.

The identification module 408 determines a second position on each concentric circle based on the position of the start graph, identifies functional data included in the encoded content from the second position, and identifies the identification code based on the identified functional data.

When the identified functional data indicates that the identification code is identified by using the first identification method, the identification module 408 can divide the concentric circles into a plurality of groups of concentric arcs based on the determined position detection patterns and the center, and then sequentially identifies the identification code on each group of concentric arcs in a clockwise or counterclockwise sequence based on the position of the start graph.

When the recognized functional data indicates that the identification code is identified by using the second identification method, the identification module 408 successively selects concentric circles from the several concentric circles according to a predetermined concentric circle selection rule, and identifies the identification code on the selected concentric circles in a clockwise or counterclockwise sequence.

Figure 14:
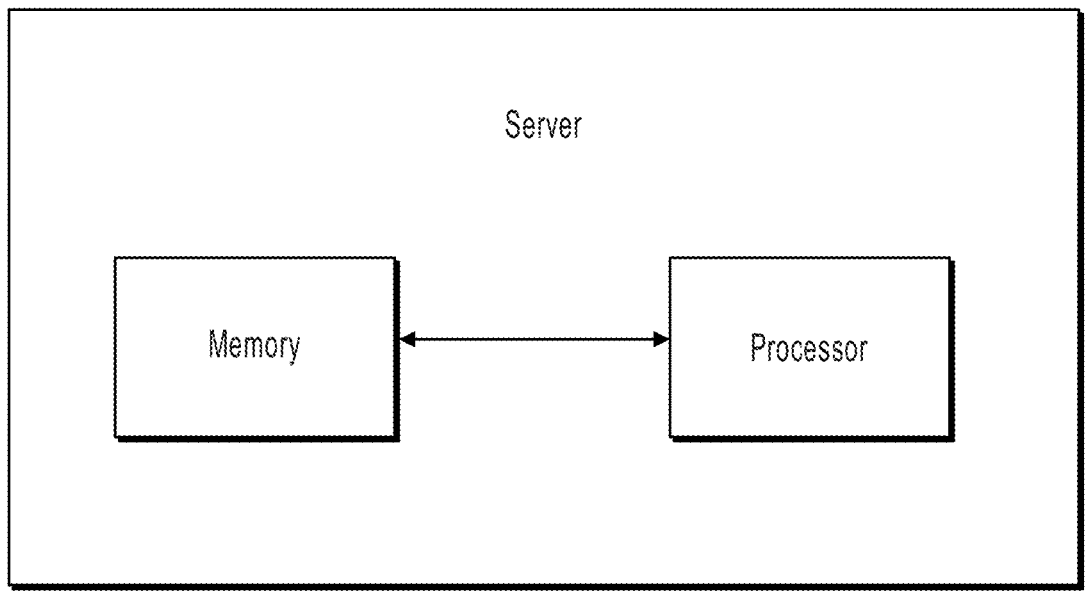
FIG. 14 is a schematic structural diagram illustrating a server, according to an implementation of the present specification.
Figure 15:
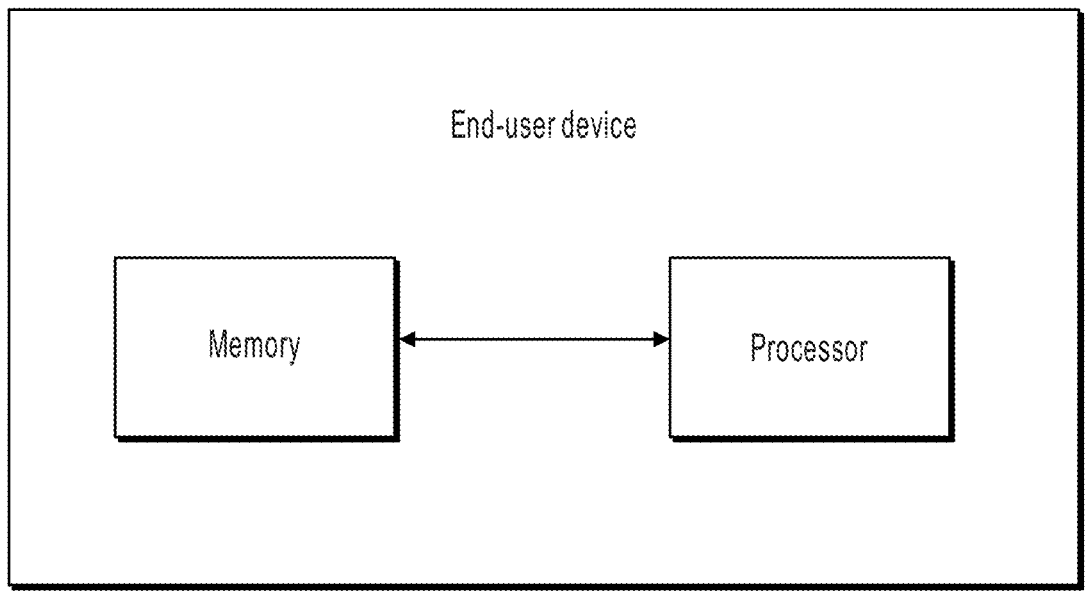
FIG. 15 is a schematic structural diagram illustrating an end-user device, according to an implementation of the present specification.

The present specification further provides a server and an end-user device, as shown in FIG. 14 and FIG. 15.

FIG. 14 is a schematic structural diagram illustrating a server, according to an implementation of the present specification. The server includes one or more processors and a memory, where the memory stores a program, and is configured to be executed by the one or more processors to perform the following steps: determining a center; determining several concentric circles based on the center, and determining, based on the center and a specified radius, several position detection patterns whose distance from the center is the radius, where the several position detection patterns are not completely the same; determining a start pattern from each position detection pattern; and encoding, on the concentric circles based on a position of the start pattern, N-ary characters corresponding to to-be-encoded content to obtain an identification code, where codes corresponding to adjacent and same characters in the N-ary characters form an arc line segment, a code corresponding to a character that is different from both adjacent characters in the N-ary characters is a point, codes corresponding to different characters in the N-ary characters have different colors, and N is a positive integer not less than two.

FIG. 15 is a schematic structural diagram illustrating an end-user device, according to an implementation of the present specification. The end-user device includes one or more processors and a memory, where the memory stores a program, and is configured to be executed by the one or more processors to perform the following steps: collecting an image; determining the position detection patterns from the image; determining a start pattern from each position detection pattern; and obtaining, from the image based on the position of the start graph, the encoded content corresponding to the identification code.

It is worthwhile to note that the implementations in the present specification are all described in a progressive manner, for same or similar parts in the implementations, reference may be made to these implementations, and each implementation focuses on a difference from other implementations. Especially, the mobile device and the server provided in the implementations of the present application are basically similar to the method implementations, and therefore are described briefly; for related parts, reference may be made to partial descriptions in the method implementations.

In the 1990s, improvements to a technology can be clearly distinguished as improvements in hardware (for example, improvements to circuit structures such as diodes, transistors, switches, etc.) or software (improvements to method processes). However, with the development of technology, many current improvements in method processes can be considered as direct improvements to the hardware circuit structure. Almost all designers obtain the corresponding hardware circuit structure by programming the improved method process into the hardware circuit. Therefore, an improvement to a method process can be implemented by using a hardware entity module. For example, a programmable logic device (PLD) (for example, a field programmable gate array (FPGA)) is such an integrated circuit, and a logical function of the programmable logic device is determined by a user by programming a component. The designer performs programming to "integrate" a digital system to a PLD instead of requiring the chip manufacturer to design and manufacture a dedicated integrated circuit chip. In addition, today, instead of making an integrated circuit chip manually, programming is mostly implemented by using "logic compiler" software, which is similar to the software compiler used when the program is developed and written, and the original code to be compiled is also written in a specific programming language, which is referred to as a hardware description language (HDL). There is not only one HDL. There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). Currently, Very-High-Integrated Circuit Description Language (VHDL) and Verilog are most commonly used. It should also be clear to a person skilled in the art that a hardware circuit for implementing the logic method procedure can be easily obtained by means of slightly logic programming and programming into an integrated circuit by using the previously described several hardware description languages.

The controller may be implemented in any suitable manner, for example, the controller may take the form of a microprocessor or a processor, a computer readable medium that stores a computer readable program code (such as software or firmware) that can be executed by the processor (or the microprocessor), a logic gate, a switch, an application specific integrated circuit (ASIC), a programmable logic controller, and an embedded microcontroller. Examples of the controller include but are not limited to the following microcontrollers: ARC625D, Atmel AT91SAM, Microchip PIC18F26K20, and Silicone Labs C8051F320. The controller can further be implemented as a part of the control logic of the memory. A person skilled in the art also knows that, in addition to implementing the controller in a pure computer readable program code manner, a method step can be logically programmed, so that the controller implements a same function in a form of a logic gate, a switch, an application-specific integrated circuit, a programmable logic controller, an embedded microcontroller, and the like. Therefore, the controller can be considered as a hardware component, and an apparatus included in the controller for implementing various functions can also be considered as a structure in the hardware component. Alternatively, an apparatus for implementing various functions can be considered as a software module that can implement the method or a structure in a hardware component.

The system, apparatus, module, or unit described in the previous implementation can be specifically implemented by a computer chip or an entity, or can be implemented by a product that has a specific function. A typical implementation device is a computer. Specifically, the computer can be, for example, a personal computer, a laptop computer, a cellular phone, a camera phone, a smart phone, a personal digital assistant, a media player, a navigation device, an e-mail device, a game console, a tablet computer, a wearable device, or a combination of any one of these devices.

For ease of description, the previous apparatus is described by dividing the functions into various units. Certainly, when the present application is implemented, the functions of each unit can be implemented in one or more pieces of software and/or hardware.

A person skilled in the art should understand that the implementations of the present disclosure may be provided as a method, a system, or a computer program product. Therefore, the present disclosure may use a form of hardware only implementations, software only implementations, or implementations with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the implementations of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or other programmable devices, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computer device includes one or more processors (CPU), an input/output interface, a network interface, and a memory.

The memory may include forms such as a non-persistent storage in a computer readable medium, a random access memory (RAM) and/or a non-volatile memory, such as a read-only memory (ROM) or a flash memory (flash RAM). The memory is an example of the computer readable medium.

The computer readable medium includes a persistent and a non-persistent, a removable and a non-removable medium, which implement information storage by using any method or technology. Information may be a computer readable instruction, a data structure, a module of a program or other data. Examples of a storage medium of a computer include, but are not limited to: a phase change memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc-read only memory (CD-ROM), a digital versatile disc (DVD) or another optical storage device, a cassette tape, disk and tape memory or another magnetic storage device, or any other non-transmission media, which may be configured to store information that can be accessed by a computer device. According to limitations of the present specification, the computer readable medium does not include a non-transitory medium (transitory media), such as a modulated data signal and a modulated carrier.

It should be further noted that, the terms "include", "comprise", or their any other variant is intended to cover a non-exclusive inclusion, so that a process, a method, a product, or an apparatus that includes a list of elements not only includes those elements but also includes other elements which are not expressly listed, or further includes elements inherent to such process, method, product, or apparatus. An element preceded by "includes a . . . " does not, without more constraints, preclude the existence of additional identical elements in the process, method, product, or apparatus that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application can be described in the general context of executable computer instructions executed by a computer, for example, a program module. Generally, the program module includes a routine, a program, an object, a component, a data structure, and the like for executing a particular task or implementing a particular abstract data type. The present application can also be practiced in a distributed computing environment in which tasks are performed by remote processing devices that are connected by using a communications network. In the distributed computing environment, program modules may be located in both local and remote computer storage media including storage devices.

The implementations in the present disclosure are all described in a progressive manner, for same or similar parts in the implementations, reference may be made to these implementations, and each implementation focuses on a difference from other implementations. Especially, a system implementation is basically similar to a method implementation, and therefore is described briefly; for related parts, reference may be made to partial descriptions in the method implementation.

The previous descriptions are merely implementations of the present application, and are not used to limit the present application. Various changes and modifications can be made to the present application by those skilled in the art. Any modification, equivalent replacement, or improvement made without departing from the spirit and principle of the present application shall fall within the scope of the claims of the present application.

What is claimed is:

1. A computer-implemented method comprising:
   determining a center of a circular identification code that is to be generated;
   determining a plurality of concentric circles around the center of the circular identification code that is to be generated;
   determining a position detection pattern based on a particular concentric circle that has a particular radius from the center of the circular identification code that is to be generated;
   determining, for the position detection pattern, a position of a start pattern; and
   encoding, on the position detection pattern and based on the position of the start pattern, N-ary characters corresponding to a to-be-encoded content to obtain the identification code, wherein:

codes corresponding to adjacent and same characters in the N-ary characters form an arc line segment having the particular radius, a code corresponding to a character that is different from both adjacent characters in the N-ary characters is a circular point, and codes corresponding to different characters in the N-ary characters have different colors, and N is a positive integer not less than two.

2. The method of claim 1, wherein determining the position of the start pattern comprises selecting a particular position from among multiple positions along the particular concentric circle that have been designated as a candidate start positions.

3. The method of claim 1, wherein each of the multiple positions have equal spacing around the particular concentric circle.

4. The method of claim 1, wherein determining the position of the start pattern comprises:

establishing a polar coordinate system around the center of the circular identification code that is to be generated.

5. The method of claim 1, wherein the position detection pattern includes a region having a predetermine thickness around the particular concentric circle.

6. The method of claim 1, wherein the N-ary characters are encoded in a counterclockwise pattern.

7. The method of claim 1, comprising:

generating non-functional data within an area that is surrounded by one of the concentric circles that has a smallest radius.

8. A non-transitory, computer-readable medium storing one or more instructions executable by a computer system to perform operations comprising:

determining a center of a circular identification code that is to be generated;

determining a plurality of concentric circles around the center of the circular identification code that is to be generated;

determining a position detection pattern based on a particular concentric circle that has a particular radius from the center of the circular identification code that is to be generated;

determining, for the position detection pattern, a position of a start pattern; and encoding, on the position detection pattern and based eft-a on the position of the start pattern, N-ary characters corresponding to a to-be-encoded content to obtain the identification code, wherein:

codes corresponding to adjacent and same characters in the N-ary characters form an arc line segment having the particular radius, a code corresponding to a character that is different from both adjacent characters in the N-ary characters is a circular point, and codes corresponding to different characters in the N-ary characters have different colors, and N is a positive integer not less than two.

9. The medium of claim 8, wherein determining the position of the start pattern comprises selecting a particular position from among multiple positions along the particular concentric circle that have been designated as a candidate start positions.

10. The medium of claim 8, wherein each of the multiple positions have equal spacing around the particular concentric circle.

11. The medium of claim 8, wherein determining the position of the start pattern comprises:

establishing a polar coordinate system around the center of the circular identification code that is to be generated.

12. The medium of claim 8, wherein the position detection pattern includes a region having a predetermine thickness around the particular concentric circle.

13. The medium of claim 8, wherein the N-ary characters are encoded in a counterclockwise pattern.

14. The medium of claim 8, wherein the operations comprise:

generating non-functional data within an area that is surrounded by one of the concentric circles that has a smallest radius.

15. A computer-implemented system comprising:

one or more computers; and one or more computer memory devices interoperably coupled with the one or more computers and having tangible, non-transitory, machine-readable media storing one or more instructions that, when executed by the one or more computers, perform one or more operations comprising:

determining a center of a circular identification code that is to be generated;

determining a plurality of concentric circles around the center of the circular identification code that is to be generated;

determining a position detection pattern based on a particular concentric circle that has a particular radius from the center of the circular identification code that is to be generated;

determining, for the position detection pattern, a position of a start pattern; and encoding, on the position detection pattern and based on the position of the start pattern, N-ary characters corresponding to a to-be-encoded content to obtain the identification code, wherein:

codes corresponding to adjacent and same characters in the N-ary characters form an arc line segment having the particular radius, a code corresponding to a character that is different from both adjacent characters in the N-ary characters is a circular point, and codes corresponding to different characters in the N-ary characters have different colors, and N is a positive integer not less than two.

16. The method of claim 15, wherein determining the position of the start pattern comprises selecting a particular position from among multiple positions along the particular concentric circle that have been designated as a candidate start positions.

17. The method of claim 15, wherein each of the multiple positions have equal spacing around the particular concentric circle.

18. The method of claim 15, wherein determining the position of the start pattern comprises:

establishing a polar coordinate system around the center of the circular identification code that is to be generated.

19. The method of claim 15, wherein the position detection pattern includes a region having a predetermine thickness around the particular concentric circle.

20. The method of claim 15, wherein the N-ary characters are encoded in a counterclockwise pattern.

* * * * *

UNITED STATES PATENT AND TRADEMARK OFFICE
CERTIFICATE OF CORRECTION

PATENT NO. : 10,789,441 B2  
APPLICATION NO. : 16/698271  
DATED : September 29, 2020  
INVENTOR(S) : Yinhai Tu Page 1 of 1

It is certified that error appears in the above-identified patent and that said Letters Patent is hereby corrected as shown below:

In the Claims

Column 24/Line 48, In Claim 16, delete "method", and insert -- system --, therefor.

Column 24/Line 53, In Claim 17, delete "method", and insert -- system --, therefor.

Column 24/Line 56, In Claim 18, delete "method", and insert -- system --, therefor.

Column 24/Line 61, In Claim 19, delete "method", and insert -- system --, therefor.

Column 24/Line 44, In Claim 20, delete "method", and insert -- system --, therefor.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*